US010961471B2

(12) United States Patent
Gong et al.

(10) Patent No.: US 10,961,471 B2
(45) Date of Patent: Mar. 30, 2021

(54) PROCESS FOR PRODUCING CATALYTIC CRACKING GASOLINE WITH A HIGH OCTANE NUMBER

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Jianhong Gong, Beijing (CN); Zekun Li, Beijing (CN); Jinlian Tang, Beijing (CN); Anguo Mao, Beijing (CN); Jiushun Zhang, Beijing (CN); Yuying Zhang, Beijing (CN); Jun Long, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 86 days.

(21) Appl. No.: 16/169,424

(22) Filed: Oct. 24, 2018

(65) Prior Publication Data
US 2019/0119586 A1    Apr. 25, 2019

(30) Foreign Application Priority Data

Oct. 25, 2017 (CN) .......................... 201711010110.6
Oct. 25, 2017 (CN) .......................... 201711016169.6

(51) Int. Cl.
*C10G 69/04* (2006.01)
*C10G 11/18* (2006.01)
(Continued)

(52) U.S. Cl.
CPC ................. *C10G 69/04* (2013.01); *B01J 8/26* (2013.01); *C10G 11/05* (2013.01); *C10G 11/182* (2013.01);
(Continued)

(58) Field of Classification Search
None
See application file for complete search history.

(56) References Cited

U.S. PATENT DOCUMENTS 4,585,545 A    4/1986   Yancey, Jr. et al.
5,944,982 A    8/1999   Lomas
(Continued)

FOREIGN PATENT DOCUMENTS

CN    1422327 A    6/2003
CN    1423689 A    6/2003
(Continued)

OTHER PUBLICATIONS

Cuiding Yang et al., "Petrochemical analysis method (RIPP experiment method)", 1990, ISBN 7-03-001894-X/TE, pp. 263-268, China Science Publishing &Media LTD.

*Primary Examiner* — Derek N Mueller
(74) *Attorney, Agent, or Firm* — Novick, Kim & Lee, PLLC; Allen Xue

(57) ABSTRACT

A process for producing catalytic cracking gasoline includes the following steps: i) subjecting a heavy feedstock oil to a catalytic cracking reaction in the presence of a first catalytic cracking catalyst to obtain a first reaction product; ii) subjecting a hydrogenated cycle oil to a catalytic cracking reaction in the presence of a second catalytic cracking catalyst to obtain a second reaction product; iii) separating a mixture of the first reaction product and the second reaction product to obtain a catalytic cracking gasoline and a catalytic cracking light cycle oil; iv) subjecting the cata-
(Continued)

lytic cracking light cycle oil or a fraction thereof to hydrogenation to obtain a hydrogenated product; and v) recycling the hydrogenated product to the step ii) as the hydrogenated cycle oil.

18 Claims, 4 Drawing Sheets

(51) Int. Cl.
    *C10G 45/12*       (2006.01)
    *C10G 45/08*       (2006.01)
    *C10G 45/50*       (2006.01)
    *C10G 51/06*       (2006.01)
    *C10G 11/05*       (2006.01)
    *B01J 8/26*         (2006.01)

(52) U.S. Cl.
CPC ............ *C10G 11/187* (2013.01); *C10G 45/08* (2013.01); *C10G 45/12* (2013.01); *C10G 45/50* (2013.01); *C10G 51/06* (2013.01); *C10G 2300/107* (2013.01); *C10G 2300/1033* (2013.01); *C10G 2300/1077* (2013.01); *C10G 2300/4081* (2013.01); *C10G 2300/70* (2013.01); *C10G 2300/807* (2013.01); *C10G 2400/02* (2013.01)

(56) References Cited

U.S. PATENT DOCUMENTS

| | | | |
|---|---|---|---|
| 6,569,315 | B2 | 5/2003 | Stuntz et al. |
| 6,569,316 | B2 | 5/2003 | Winter |
| 6,811,682 | B2 | 11/2004 | Stuntz et al. |
| 2001/0042700 | A1 | 11/2001 | Swan et al. |
| 2014/0034554 | A1* | 2/2014 | Kulprathipanja .......... B01J 8/26 |
| | | | 208/48 R |
| 2018/0327335 | A1* | 11/2018 | Larsen ...................... C07C 4/06 |

FOREIGN PATENT DOCUMENTS

| | | |
|---|---|---|
| CN | 1425054 A | 6/2003 |
| CN | 1466619 A | 1/2004 |
| CN | 101687130 A | 3/2010 |
| CN | 102233253 A | 11/2011 |
| CN | 102925207 A | 2/2013 |
| CN | 103571534 A | 2/2014 |
| CN | 103627434 A | 3/2014 |
| CN | 104560167 A | 4/2015 |
| CN | 204509215 U | 7/2015 |
| CN | 105505462 A | 4/2016 |
| CN | 105802663 A | 7/2016 |

* cited by examiner

PROCESS FOR PRODUCING CATALYTIC CRACKING GASOLINE WITH A HIGH OCTANE NUMBER

CROSS REFERENCE TO RELATED APPLICATIONS

The present application claims the priority of the Chinese patent application No. 201711010110.6, filed on Oct. 25, 2017 before the Chinese Patent Office, entitled "Process for Producing High-octane Gasoline", and the priority of the Chinese patent application No. 201711016169.6, filed on Oct. 25, 2017 before the Chinese Patent Office, entitled "Catalytic Cracking Process and System Using Double Riser Reactors", the contents of which are incorporated herein by reference in their entirety.

TECHNICAL FIELD

The present application relates to the technical field of catalytic cracking, and in particular to a process for producing catalytic cracking gasoline with a high octane number.

BACKGROUND ART

With the increased use of heavy crude oils and the rapid growth of demand for light oil products, catalytic cracking techniques for converting heavy oils into light oils have developed rapidly in China. However, a fact that must be faced is that catalytic cracking diesel (also referred to as "light cycle oil (LCO)") normally has a relatively poor quality, high density, high aromatics content, and low cetane value. Thus, it is difficult to meet the increasingly stringent diesel specifications, even through diesel hydrotreatment technology. It becomes an increasingly serious problem to process the catalytic cracking light cycle oil. Another problem is the long-term shortage of finished gasoline in China, in which catalytic cracking gasoline accounts for 80% of the finished gasoline. Therefore, it may be a new way to solve the above problems by maximizing the production of high-octane gasoline through a catalytic cracking process that can produce high-octane gasoline without producing light cycle oil.

U.S. Pat. No. 4,585,545 A discloses a catalytic conversion process comprising the step of subjecting a full-range catalytic cracking light cycle oil to hydrotreatment to obtain a hydrogenated light cycle oil, followed by catalytic cracking to produce a gasoline rich in monocyclic aromatics.

Chinese Patent Application Publication No. CN1422327A discloses a process for the upgrading of a catalytic cracking light cycle oil, comprising the steps of subjecting a light cycle oil produced by a first catalytic cracking unit using a heavy oil as a starting material to deep hydrogenation, and then passing the hydrogenated light cycle oil to a second catalytic cracking unit. As developed on the basis of this process, Chinese Patent Application Publication No. CN1423689A further emphasizes that, to selectively increase the yield of light olefins, the catalyst used in the second catalytic cracking unit is required to comprise 50-95% of a shape-selective zeolite and about 5-50% of a macroporous zeolite having a pore diameter of greater than or equal to about 0.7 nm.

Chinese Patent Application Publication No. CN1466619A discloses a process for the conversion of catalytic cracking light cycle oil, in which a catalytic cracking riser reactor is divided into two reaction zones, i.e. a upstream reaction zone and a downstream reaction zone, a heavy oil is sprayed into the downstream reaction zone, the resultant catalytic cracking light cycle oil product is hydrogenated to obtain a hydrogenated light cycle oil, which is then sprayed into the upstream reaction zone. As developed on the basis of this process, the process described in Chinese Patent Application Publication No. CN1425054A adds naphtha to the feed to the upstream zone in addition to the hydrogenated light cycle oil. However, this process has high hydrogen consumption, and the reaction of the hydrogenated light cycle oil in the upstream zone seriously affects the conversion of the downstream heavy oil.

There is still a need in the art for a process that can reduce the production of light cycle oil, increase the production of catalytic cracking gasoline, and simultaneously increase its octane number.

SUMMARY OF THE INVENTION

In view of the problems in the prior art, it is an object of the present application to provide a process and system for producing catalytic cracking gasoline, which may produce more catalytic cracking gasoline with a high octane number by feeding a hydrogenated cycle oil and a heavy feedstock oil to a reactor at different points and providing a supplementary catalyst.

In order to achieve the above object, the present application provides, in an aspect, a process for producing catalytic cracking gasoline comprising the following steps:

i) subjecting a heavy feedstock oil to a catalytic cracking reaction in the presence of a first catalytic cracking catalyst to obtain a first reaction product;

ii) subjecting a hydrogenated cycle oil to a catalytic cracking reaction in the presence of a second catalytic cracking catalyst to obtain a second reaction product;

iii) separating a mixture of the first reaction product and the second reaction product to obtain a catalytic cracking gasoline and a catalytic cracking light cycle oil;

iv) subjecting the catalytic cracking light cycle oil or a fraction thereof to hydrogenation to obtain a hydrogenated product; and v) recycling the hydrogenated product to the step ii) as the hydrogenated cycle oil, wherein the step ii) and the step i) are carried out in a single riser reactor, and the heavy feedstock oil and the hydrogenated cycle oil are fed into the riser reactor at different heights thereof, and the first catalytic cracking catalyst and the second catalytic cracking catalyst are injected into the riser reactor at different points; or the step ii) and the step i) are carried out in separate riser reactors, and the second reaction product is fed into the upper middle portion of the riser reactor used in the step i), where it is mixed with the first reaction product.

In some preferred embodiments, the process according to the present application comprises the following steps:

i) spraying the heavy feedstock oil into a riser reactor via a first nozzle, injecting the first catalytic cracking catalyst into the riser reactor at a first injection point located below the first nozzle, and subjecting the heavy feedstock oil to a catalytic cracking reaction to obtain a first reaction product;

ii) spraying the hydrogenated cycle oil into the riser reactor used in the step i) via a second nozzle, injecting the second catalytic cracking catalyst into the riser reactor at a second injection point located below the second nozzle, and subjecting the hydrogenated cycle oil to a catalytic cracking reaction to obtain a second reaction product;

iii) separating a mixture of the first reaction product and the second reaction product to obtain a catalytic cracking gasoline and a catalytic cracking light cycle oil;

iv) subjecting the catalytic cracking light cycle oil or a fraction thereof to hydrogenation to obtain a hydrogenated product; and v) recycling the hydrogenated product to the step ii) as the hydrogenated cycle oil, wherein the second nozzle and the first nozzle are disposed at different heights of the riser reactor, and the second injection point is different from the first injection point.

Further preferably, along the height direction of the riser reactor, the second nozzle is disposed above the first nozzle, and the second injection point is located at a position between the first nozzle and the second nozzle.

Still more preferably, the reaction time in the riser reactor section between the first nozzle and the second nozzle is between about 0.05 and about 2 seconds.

Particularly preferably, the reaction conditions in the riser reactor are as follows: a reaction temperature ranging from about 450 to about 650° C., an absolute pressure ranging from about 0.15 to about 0.4 MPa, a weight ratio of the total weight of the first and second catalytic cracking catalysts to the heavy feedstock oil ranging from about 1 to about 50, a reaction time of the heavy feedstock oil ranging from about 1 to about 10 seconds, and a weight ratio of steam to the heavy feedstock oil ranging from about 0.01 to about 0.5; a weight ratio of the total weight of the first and second catalytic cracking catalysts to the hydrogenated cycle oil ranging from about 5 to about 100, a reaction time of the hydrogenated cycle oil ranging from about 1 to about 10 seconds, and a weight ratio of steam to the hydrogenated cycle oil ranging from about 0.01 to about 0.3, with both the first catalytic cracking catalyst and the second catalytic cracking catalyst having a micro-activity of no less than about 60.

In some preferred embodiments, the process according to the present application comprises the following steps:

i) spraying the heavy feedstock oil into a primary riser reactor via a first nozzle, injecting the first catalytic cracking catalyst into the primary riser reactor at a first injection point located below the first nozzle, and subjecting the heavy feedstock oil to a catalytic cracking reaction to obtain a first reaction product;

ii) spraying the hydrogenated cycle oil into a secondary riser reactor via a second nozzle, injecting the second catalytic cracking catalyst into the secondary riser reactor at a second injection point located below the second nozzle, and subjecting the hydrogenated cycle oil to a catalytic cracking reaction to obtain a second reaction product;

iii) separating a mixture of the first reaction product and the second reaction product to obtain a catalytic cracking gasoline and a catalytic cracking light cycle oil;

iv) subjecting the catalytic cracking light cycle oil or a fraction thereof to hydrogenation to obtain a hydrogenated product; and v) recycling the hydrogenated product to the step ii) as the hydrogenated cycle oil, wherein the second reaction product is fed into the upper middle portion of the primary riser reactor, where it is mixed with the first reaction product.

Further preferably, the primary riser reactor comprises a first reaction section and a second reaction section that are coaxially arranged from bottom to top, with the inner diameter of the second reaction section being larger than that of the first reaction section, and the outlet of the secondary riser reactor is connected to the second reaction section via a horizontal pipe.

Still more preferably, the reaction conditions in the primary riser reactor are as follows: a reaction temperature ranging from about 450 to about 550° C., a weight ratio of the first catalytic cracking catalyst to the heavy feedstock oil ranging from about 4 to about 8, a reaction time ranging from about 2 to about 10 seconds, an absolute pressure ranging from about 0.15 to about 0.4 MPa, a weight ratio of steam to the heavy feedstock oil ranging from about 0.02 to about 0.08, and a micro-activity of the first catalytic cracking catalyst of no less than about 60; and/or the reaction conditions in the secondary riser reactor are as follows: a reaction temperature ranging from about 520 to about 650° C., an absolute pressure ranging from about 0.15 to about 0.4 MPa, a weight ratio of the second catalytic cracking catalyst to the hydrogenated cycle oil ranging from about 5 to about 100, a reaction time ranging from about 1 to about 10 seconds, a weight ratio of steam to the hydrogenated cycle oil ranging from about 0.01 to about 0.3, and a micro-activity of the second catalytic cracking catalyst of no less than about 60.

In a preferred embodiment of the process according to the present application, the catalytic cracking light cycle oil is split into a light fraction and a heavy fraction prior to the step iv), the heavy fraction is subjected to hydrogenation in the step iv) to obtain the hydrogenated product; and the light fraction is recycled to the step ii) and subjected to a catalytic cracking reaction in the presence of the second catalytic cracking catalyst.

In a preferred embodiment of the process according to the present application, the hydrogenation step iv) is carried out to an extent that the resultant hydrogenated product has a bicyclic aromatics content of no more than about 20% by weight, a hydrogen content of no less than about 10% by weight, and an initial boiling point of greater than about 165° C.

In another aspect, the present application provides a catalytic cracking system comprising a primary riser reactor, a secondary riser reactor, a regenerator, a disengager, a main fractionation column, a light cycle oil fractionation column, and a hydrogenation reactor, wherein:

the primary riser reactor is provided with a lower feed inlet, a bottom catalyst inlet and a top outlet, the secondary riser reactor is provided with a first feed inlet and a second feed inlet at a lower portion, a bottom catalyst inlet and a top outlet, and the top outlet of the secondary riser reactor is connected to the upper middle portion of the primary riser reactor via a horizontal pipe, the top outlet of the primary riser reactor is connected to an inlet of the disengager, a catalyst outlet of the disengager is connected to the regenerator, an oil-gas outlet of the disengager is connected to an inlet of the main fractionation column, and a light cycle oil outlet of the main fractionation column is connected to an inlet of the light cycle oil fractionation column, a heavy fraction outlet of the light cycle oil fractionation column is connected to an inlet of the hydrogenation reactor, a light fraction outlet of the light cycle oil fractionation column is connected to the second feed inlet of the secondary riser reactor, and a hydrogenated product outlet of the hydrogenation reactor is connected to the first feed inlet of the secondary riser reactor, and a regenerated catalyst outlet of the regenerator is connected to the catalyst inlet of the primary riser reactor and the catalyst inlet of the secondary riser reactor, respectively.

In a preferred embodiment of the system according to the present application, the primary riser reactor comprises a first reaction section and a second reaction section that are coaxially arranged from bottom to top, with the inner diameter of the second reaction section being larger than that of the first reaction section, and the top outlet of the secondary riser reactor is connected to the second reaction section via a horizontal pipe.

As compared to the prior arts, the process and system according to the present application may bring about one or more of the following advantages:

1. a complete elimination of the production of light cycle oil may be achieved;

2. by feeding the heavy feedstock oil and the hydrogenated cycle oil to a single riser reactor at different heights thereof and providing a supplementary catalytic cracking catalyst, the two feedstock oils may be processed separately, which may allow an optimization of the reaction conditions employed for the two feedstock oils individually, and in turn result in a maximum conversion thereof, so that more catalytic cracking gasoline with a high octane number may be produced; and by feeding the hydrogenated cycle oil downstream of the heavy feedstock oil, the reaction time of the hydrogenated cycle oil may be effectively shortened, so that the yield of high-octane gasoline may be further increased; and 3. by processing the heavy feedstock oil and the hydrogenated cycle oil separately in the primary and secondary riser reactors, different reaction conditions may be employed in those riser reactors, so that an optimization may be conducted to meet the harsh conditions required for the catalytic cracking of the hydrogenated cycle oil; and, meanwhile, by connecting the outlet of the secondary riser reactor directly to the upper middle portion of the primary riser reactor, the reaction time of the hydrogenated cycle oil may be shortened, so that more catalytic cracking gasoline with a high octane number may be produced more, the equipment may be simplified and the equipment costs may be reduced.

Other characteristics and advantages of the present invention will be described hereinafter in detail in the Detailed Description section.

BRIEF DESCRIPTION OF THE DRAWINGS

The drawings, forming a part of the present description, are provided to help the understanding of the present application, and should not be considered to be limiting. The present application can be interpreted with reference to the drawings in combination with the detailed description hereinbelow. In the drawings.

Figure 1:
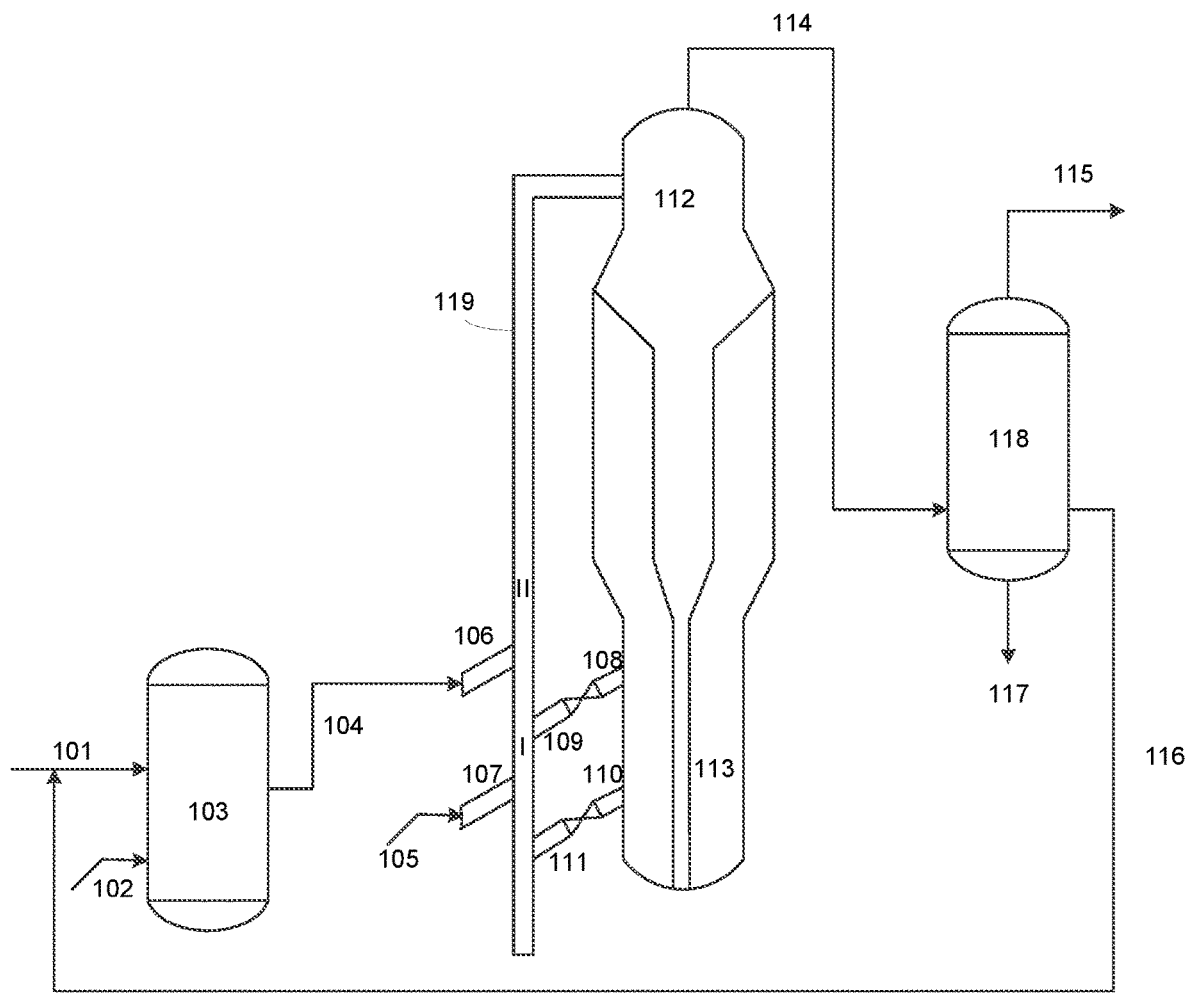
FIG. 1 is a schematic flow diagram of a preferred embodiment according to the present application.

Description of the reference numerals shown in FIG. 1

| 101 | Light cycle oil pipeline | 102 | Hydrogen pipeline |
| 103 | Hydrogenation reactor | 104 | Hydrogenated cycle oil pipeline |
| 105 | Heavy feedstock oil pipeline | 106 | Second nozzle |
| 107 | First nozzle | | |
| 108 | Second regenerated catalyst sloped tube | | |
| 109 | Second regenerated catalyst slide valve | | |
| 110 | First regenerated catalyst sloped tube | | |
| 111 | First regenerated catalyst slide valve | | |
| 112 | Disengager | 113 | Regenerator |
| 114 | Product pipeline | 115 | Oil-gas pipeline |
| 116 | Recycle pipeline | 117 | Slurry oil pipeline |
| 118 | Fractionation column | 119 | Riser reactor |
| I | Heavy feedstock oil reaction zone | | |
| II | Hydrogenated cycle oil reaction zone | | |

Figure 2:
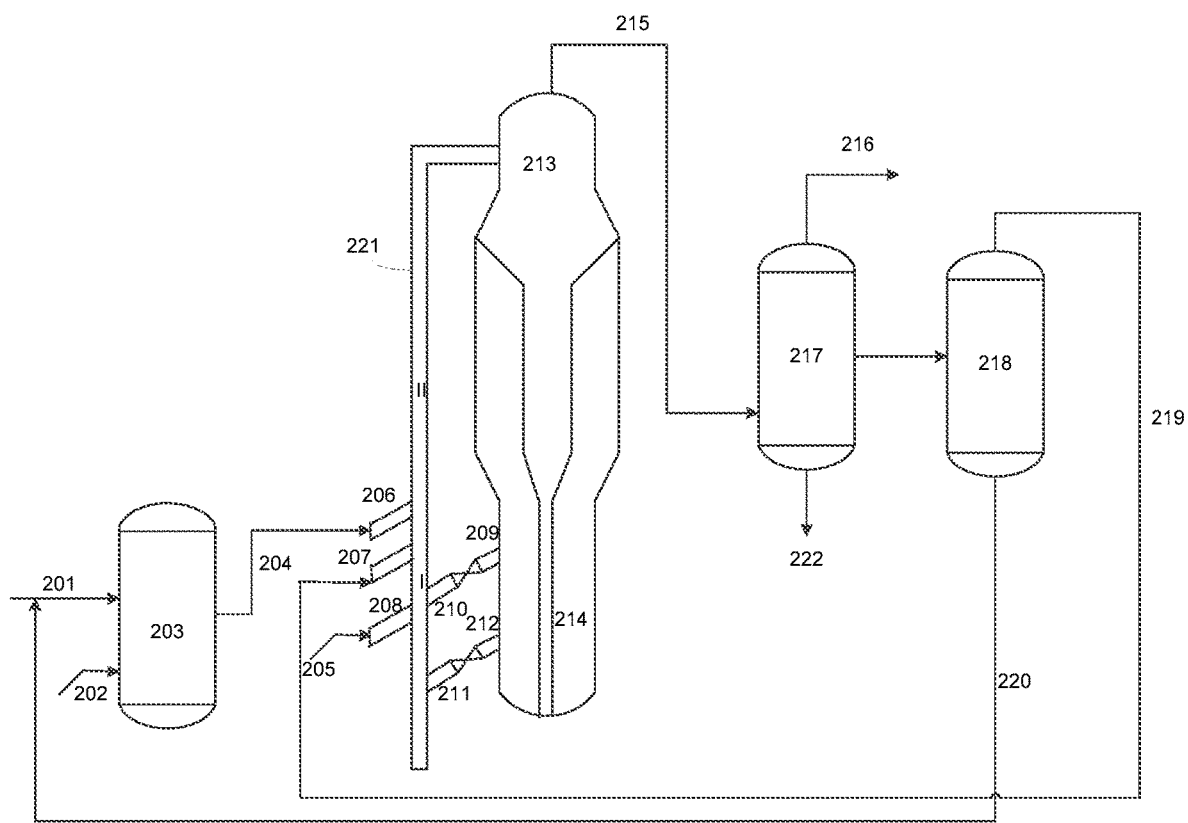
FIG. 2 is a schematic flow diagram of a further preferred embodiment according to the present application.

Description of the reference numerals shown in FIG. 2

| 201 | Heavy fraction pipeline | 202 | Hydrogen pipeline |
| 203 | Hydrogenation reactor | 204 | Hydrogenated cycle oil pipeline |
| 205 | Heavy feedstock oil pipeline | 206 | Second nozzle |
| 207 | Third nozzle | 208 | First nozzle |
| 209 | Second regenerated catalyst sloped tube | | |
| 210 | Second regenerated catalyst slide valve | | |
| 211 | First regenerated catalyst sloped tube | | |
| 212 | First regenerated catalyst slide valve | | |
| 213 | Disengager | 214 | Regenerator |
| 215 | Product pipeline | 216 | Oil-gas pipeline |
| 217 | Main fractionation column | | |
| 218 | Light cycle oil fractionation column | | |
| 219 | Light fraction pipeline | 220 | Recycle pipeline |
| 221 | Riser reactor | | |
| I | Heavy feedstock oil reaction zone | | |
| II | Hydrogenated cycle oil reaction zone | | |

Figure 3:
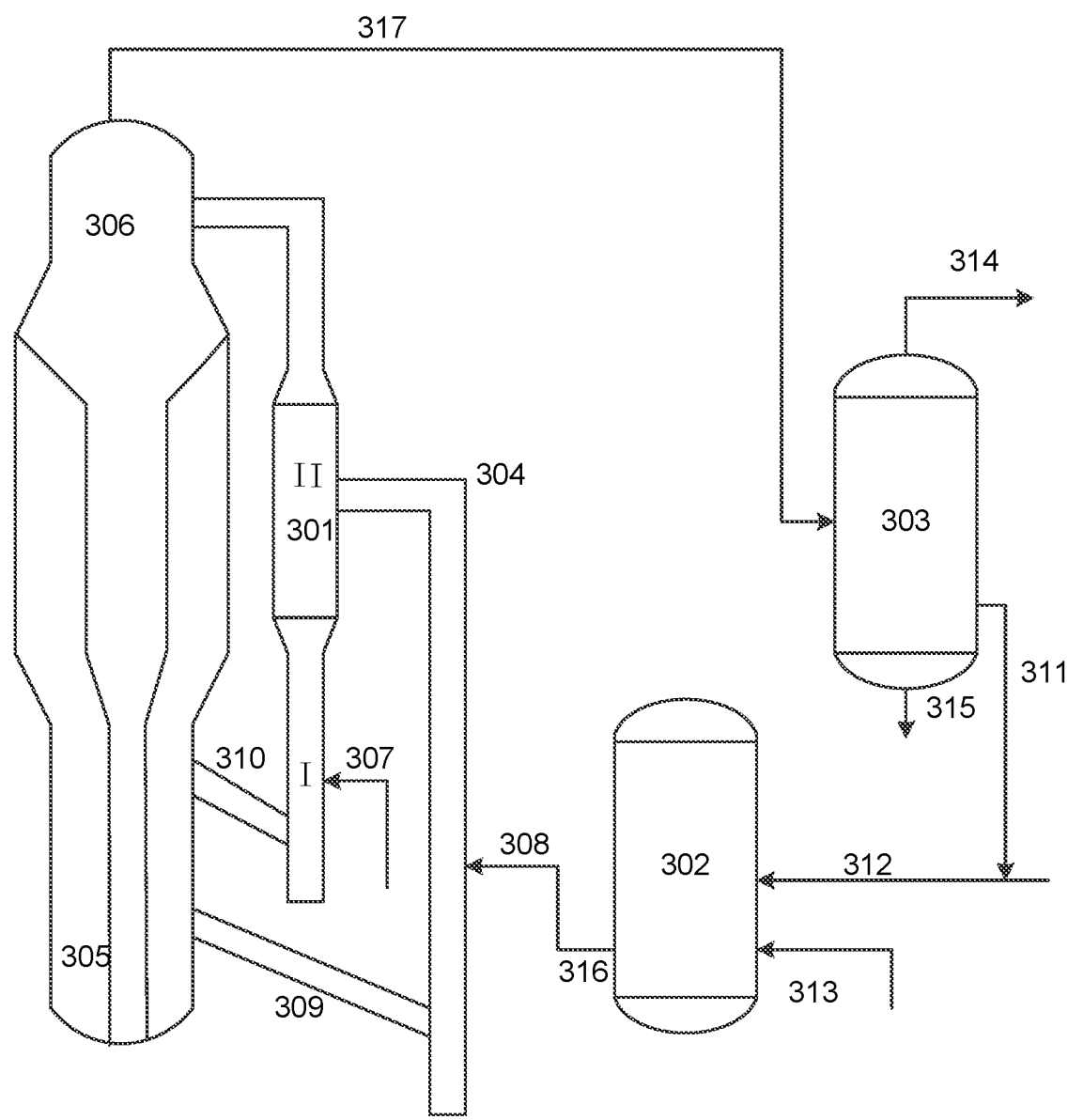
FIG. 3 is a schematic flow diagram of another preferred embodiment according to the present application.

Description of the reference numerals shown in FIG. 3

| 301 | Primary riser reactor | 302 | Hydrogenation reactor |
| 303 | Fractionation column | 304 | Secondary riser reactor |
| 305 | Regenerator | 306 | Disengager |
| 307 | First nozzle | 308 | Second nozzle |
| 309 | Second regenerated catalyst sloped tube | | |
| 310 | First regenerated catalyst sloped tube | | |
| 311 | Recycle pipeline | 312 | Light cycle oil pipeline |
| 313 | Hydrogen pipeline | 314 | Oil-gas pipeline |
| 315 | Slurry oil pipeline | 316 | Hydrogenated cycle oil pipeline |
| 317 | Product pipeline | | |
| I | First reaction section | II | Second reaction section |

Figure 4:
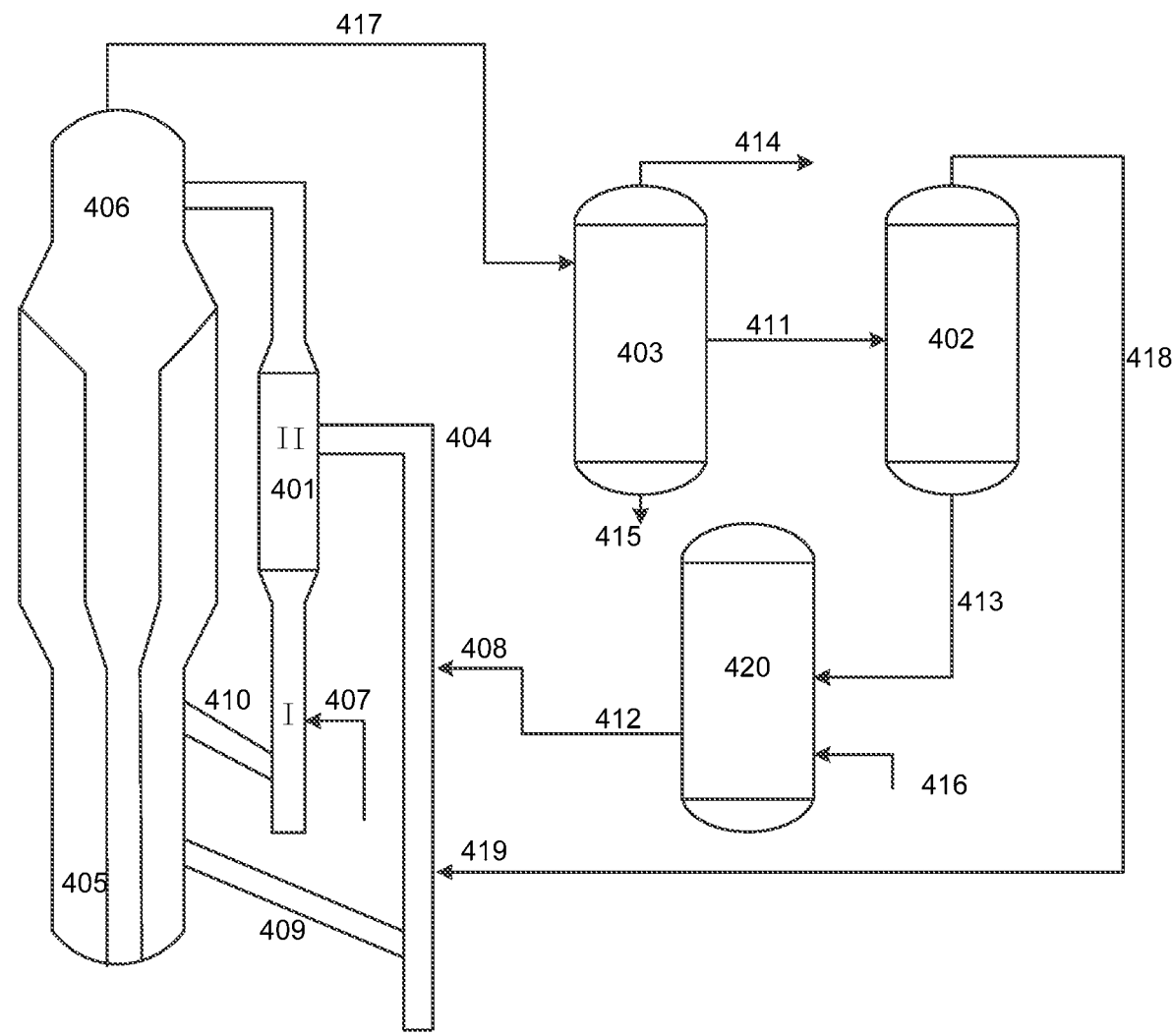
FIG. 4 is a schematic flow diagram of another further preferred embodiment according to the present application.

Description of the reference numerals shown in FIG. 4

| 401 | Primary riser reactor | | |
| 402 | Light cycle oil fractionation column | | |
| 403 | Main fractionation column | | |
| 404 | Secondary riser reactor | 405 | Regenerator |
| 406 | Disengager | 407 | First nozzle |
| 408 | Second nozzle | | |
| 409 | Second regenerated catalyst sloped tube | | |
| 410 | First regenerated catalyst sloped tube | | |
| 411 | Light cycle oil pipeline | 412 | Hydrogenated cycle oil pipeline |
| 413 | Heavy fraction pipeline | 414 | Oil-gas pipeline |
| 415 | Slurry oil pipeline | 416 | Hydrogen pipeline |
| 417 | Product pipeline | 418 | Light fraction pipeline |
| 419 | Third nozzle | 420 | Hydrogenation reactor |
| I | First reaction section | II | Second reaction section |

DETAILED DESCRIPTION OF THE INVENTION

The present application will be further described hereinafter in detail with reference to specific embodiments thereof and the accompanying drawings. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to those skilled in the art that such a combination is obviously unreasonable.

In the context of the present application, the microactivity (MAT) of the catalytic cracking catalyst is determined according to the standard method of RIPP 92-90 (see "Petrochemical Analysis Method (RIPP Test Method)", edited by Cuiding Yang, et. al., Science Press, September 1990, First Version, pages 263-268).

All of the patent and non-patent documents cited herein, including but not limited to textbooks and journal articles, are hereby incorporated by reference in their entirety.

As described above, in order to overcome the problems existing in the prior arts, the present application provides, in a first aspect, a process for producing catalytic cracking gasoline comprising the following steps:

i) subjecting a heavy feedstock oil to a catalytic cracking reaction in the presence of a first catalytic cracking catalyst to obtain a first reaction product;

ii) subjecting a hydrogenated cycle oil to a catalytic cracking reaction in the presence of a second catalytic cracking catalyst to obtain a second reaction product;

iii) separating a mixture of the first reaction product and the second reaction product to obtain a catalytic cracking gasoline and a catalytic cracking light cycle oil;

iv) subjecting the catalytic cracking light cycle oil or a fraction thereof to hydrogenation to obtain a hydrogenated product; and v) recycling the hydrogenated product to the step ii) as the hydrogenated cycle oil, wherein the step ii) and the step i) are carried out in a single riser reactor, and the heavy feedstock oil and the hydrogenated cycle oil are fed into the riser reactor at different heights thereof, and the first catalytic cracking catalyst and the second catalytic cracking catalyst are injected into the riser reactor at different points; or the step ii) and the step i) are carried out in separate riser reactors, and the second reaction product is fed into the upper middle portion of the riser reactor used in the step i), where it is mixed with the first reaction product.

In some preferred embodiments, the process according to the present application comprises the following steps:

i) spraying the heavy feedstock oil into a riser reactor via a first nozzle, injecting the first catalytic cracking catalyst into the riser reactor at a first injection point located below the first nozzle, and subjecting the heavy feedstock oil to a catalytic cracking reaction to obtain a first reaction product;

ii) spraying the hydrogenated cycle oil into the riser reactor used in the step i) via a second nozzle, injecting the second catalytic cracking catalyst into the riser reactor at a second injection point located below the second nozzle, and subjecting the hydrogenated cycle oil to a catalytic cracking reaction to obtain a second reaction product;

iii) separating a mixture of the first reaction product and the second reaction product to obtain a catalytic cracking gasoline and a catalytic cracking light cycle oil;

iv) subjecting the catalytic cracking light cycle oil or a fraction thereof to hydrogenation to obtain a hydrogenated product; and v) recycling the hydrogenated product to the step ii) as the hydrogenated cycle oil, wherein the second nozzle and the first nozzle are disposed at different heights of the riser reactor, and the second injection point is different from the first injection point.

In such preferred embodiments, there is no particular requirement for the relative positional relationship of the first nozzle and the second nozzle, and the first nozzle may be disposed above or below the second nozzle. Preferably, along the height direction of the riser reactor, the second nozzle is disposed above the first nozzle, and the second injection point is disposed at a position between the first nozzle and the second nozzle.

In such preferred embodiments, the hydrogenated cycle oil and the heavy feedstock oil are fed into the riser reactor at different levels, so that the catalytic cracking conditions can be optimized to meet the requirement of each feedstock oil, thereby resulting in a maximum conversion thereof. In addition, a supplementary catalyst is provided prior to the contact of a mixture of the resultant oil gas and spent catalyst with the hydrogenated cycle oil, which is beneficial to promote the conversion of the hydrogenated cycle oil.

In a further preferred embodiment, the reaction time in the riser reactor section between the first nozzle and the second nozzle may be in a range from about 0.05 to 2 seconds, preferably from about 0.1 to 1 second.

In a particularly preferred embodiment, the reaction conditions in the riser reactor are as follows: a reaction temperature ranging from about 450 to about 650° C., preferably from about 490 to about 550° C., an absolute pressure ranging from about 0.15 to about 0.4 MPa, a weight ratio of the total weight of the first and second catalytic cracking catalysts to the heavy feedstock oil ranging from about 1 to about 50, preferably from about 3 to about 30, and a reaction time of the heavy feedstock oil ranging from about 1 to about 10 seconds, preferably from about 2 to about 8 seconds, and a weight ratio of steam to the heavy feedstock oil ranging from about 0.01 to about 0.5, preferably from about 0.02 to about 0.2; a weight ratio of the total weight of the first and second catalytic cracking catalysts to the hydrogenated cycle oil ranging from about 5 to about 100, preferably from about 8 to about 50, a reaction time of the hydrogenated cycle oil ranging from about 1 to about 10 seconds, preferably from about 2 to about 8 seconds, and a weight ratio of steam to the hydrogenated cycle oil ranging from about 0.01 to about 0.3, preferably from about 0.01 to about 0.1, with both the first catalytic cracking catalyst and the second catalytic cracking catalyst having a micro-activity of no less than about 60, preferably no less than about 62.

In some other preferred embodiments, the process according to the present application comprises the following steps:

i) spraying the heavy feedstock oil into a primary riser reactor via a first nozzle, injecting the first catalytic cracking catalyst into the primary riser reactor at a first injection point located below the first nozzle, and subjecting the heavy feedstock oil to a catalytic cracking reaction to obtain a first reaction product;

ii) spraying the hydrogenated cycle oil into a secondary riser reactor via a second nozzle, injecting the second catalytic cracking catalyst into the secondary riser reactor at a second injection point located below the second nozzle, and subjecting the hydrogenated cycle oil to a catalytic cracking reaction to obtain a second reaction product;

iii) separating a mixture of the first reaction product and the second reaction product to obtain a catalytic cracking gasoline and a catalytic cracking light cycle oil;

iv) subjecting the catalytic cracking light cycle oil or a fraction thereof to hydrogenation to obtain a hydrogenated product; and v) recycling the hydrogenated product to the step ii) as the hydrogenated cycle oil, wherein the second reaction product is fed into the upper middle portion of the primary riser reactor, where it is mixed with the first reaction product.

In a further preferred embodiment, the reaction conditions in the primary riser reactor are as follows: a reaction temperature ranging from about 450 to about 550° C., preferably from about 500 to about 520° C., a weight ratio of the first catalytic cracking catalyst to the heavy feedstock oil ranging from about 4 to about 8, preferably from about 5 to about 7, a reaction time ranging from about 2 to about 10 seconds, preferably from about 2 to about 8 seconds, an absolute pressure ranging from about 0.15 to about 0.4 MPa, a weight ratio of steam to the heavy feedstock oil ranging from about 0.02 to about 0.08, preferably from about 0.03 to about 0.05, and a micro-activity of the first catalytic cracking catalyst of no less than about 60, preferably no less than about 62; and/or the reaction conditions in the secondary riser reactor are as follows: a reaction temperature ranging from about 520 to about 650° C., preferably from about 550 to about 590° C., an absolute pressure ranging from about 0.15 to about 0.4 MPa, a weight ratio of the second catalytic cracking catalyst to the hydrogenated cycle oil ranging from about 5 to about 100, preferably from about 8 to about 50, a reaction time ranging from about 1 to about 10 seconds, preferably from about 1 to about 8 seconds, a weight ratio of steam to the hydrogenated cycle oil ranging from about 0.01 to about 0.3, preferably from about 0.02 to about 0.2, and a micro-activity of the second catalytic cracking catalyst of no less than about 60, preferably no less than about 62.

In a preferred embodiment of the process according to the present application, the weight ratio of the first catalytic cracking catalyst to the second catalytic cracking catalyst may range from about 1:0.02 to about 1:1, preferably from about 1:0.03 to about 1:0.5.

In a preferred embodiment of the process according to the present application, the riser reactor may be an equal-diameter riser reactor with or without a fluidized bed reactor, or a variable-diameter riser reactor with or without a fluidized bed reactor.

In a further preferred embodiment, the primary riser reactor may comprise a first reaction section and a second reaction section that are coaxially arranged from bottom to top, with the inner diameter of the second reaction section being larger than that of the first reaction section, and the outlet of the secondary riser reactor is connected to the second reaction section via a horizontal pipe.

In some preferred embodiments of the process according to the present application, the catalytic cracking light cycle oil may be split into a light fraction and a heavy fraction prior to the step iv), the heavy fraction is subjected to hydrogenation to obtain the hydrogenated product in the step iv), and the light fraction is recycled to the step ii) and subjected to a catalytic cracking reaction in the presence of the second catalytic cracking catalyst.

In a further preferred embodiment, the catalytic cracking light cycle oil may be split at a cut point between about 240 and about 260° C.

In some preferred embodiments of the process according to the present application, a catalytic cracking light cycle oil from an external source or a fraction thereof may also be hydrotreated in the step iv), and the resultant hydrogenated product may be recycled to the step ii) as the hydrogenated cycle oil to conduct a catalytic cracking reaction, so as to enlarge the source of starting materials and produce more high-octane gasoline.

In the present application, the heavy feedstock oil used may be any heavy oil well known to those skilled in the art. For example, the heavy feedstock oil may be selected from the group consisting of straight-run wax oil, coker wax oil, deasphalted oil, hydrorefined oil, hydrocracking tail oil, vacuum residue, atmospheric residue, and combinations thereof. Optionally, other heavy feedstock oils may also be used in the present application either directly or after being treated in a manner well known to those skilled in the art.

In the present application, various catalysts well known to those skilled in the art that are useful in the catalytic cracking of heavy oils can be used as the catalytic cracking catalyst. In a preferred embodiment, the first catalytic cracking catalyst and the second catalytic cracking catalyst each independently comprises, on a dry basis, about 10% to about 50% by weight of a zeolite, about 5% to about 90% by weight of an inorganic oxide and about 0% to about 70% by weight of a clay, based on the weight of the catalytic cracking catalyst; the zeolite is preferably selected from the group consisting of a Y zeolite with or without a rare earth element, an HY zeolite with or without a rare earth element, a USY zeolite with or without a rare earth element, a Beta zeolite with or without a rare earth element, and combinations thereof the inorganic oxide is preferably selected from the group consisting of silica, alumina, and combinations thereof and the clay is preferably selected from kaolin and/or halloysite.

In the present application, the hydrogenation step iv) can be carried out under conditions well known to those skilled in the art. For example, the step iv) may be carried out in the presence of a hydrogenation catalyst comprising an active metallic component and a support, the active metallic component may be a Group VIB metal and/or a Group VIII non-noble metal, and the support may be selected from the group consisting of alumina, silica, amorphous silica-alumina, and combinations thereof. Preferably, the active metallic component may be nickel-tungsten, nickel-tungsten-cobalt, nickel-molybdenum or cobalt-molybdenum.

More preferably, the hydrogenation catalyst may comprise about 15% to about 30% by weight of the active metallic component and about 70% to about 85% by weight of the support.

In a preferred embodiment, the hydrogenation conditions employed in the hydrogenation step iv) may be as follows: a hydrogen partial pressure ranging from about 5.0 to about 22.0 MPa, preferably from about 8.0 to about 15.0 MPa, a reaction temperature ranging from about 330 to about 450° C., preferably from about 340 to about 380° C., a volume space velocity ranging from about 0.1 to about 10.0 $h^{-1}$, preferably from about 0.1 to about 3.0 $h^{-1}$, and a hydrogen-to-oil volume ratio ranging from about 100 to about 2000 $Nm^3/m^3$, preferably from about 350 to about 1200 $Nm^3/m^3$.

In some preferred embodiments of the process according to the present application, the product obtained in the step iv) may be separated to provide a fraction having an initial boiling point of greater than about 165° C., preferably greater than about 170° C., or a fraction having an initial boiling point of greater than about 250° C., preferably greater than about 260° C. that can be used as the hydrogenated product (which may also be referred to as a hydrogenated light cycle oil or a hydrogenated heavy fraction depending on the feedstock used in the hydrogenation). Preferably, the step iv) is carried out to an extent that the hydrogenated product has a bicyclic aromatics content of no more than about 20% by weight, preferably no more than about 10% by weight, more preferably no more than about 8% by weight, and a hydrogen content of no less than about 10% by weight, preferably no less than about 11% by weight, more preferably no less than about 14% by weight.

In some particular embodiments of the process according to the present application, the spent catalyst generated after the catalytic cracking reaction (including the first spent catalyst derived from the first catalytic cracking catalyst and the second spent catalyst derived from the second catalytic cracking catalyst) is regenerated in a regenerator by burning off the coke to obtain a regenerated catalyst, which is then recycled to the steps i) and ii), respectively, as the first catalytic cracking catalyst and the second catalytic cracking catalyst. In this case, the weight ratio of the first catalytic cracking catalyst to the second catalytic cracking catalyst refers to the cyclic weight ratio of the regenerated catalyst recycled as the first catalytic cracking catalyst to the regenerated catalyst recycled as the second catalytic cracking catalyst.

In a first kind of particular embodiments, the present application provides a process for producing catalytic cracking gasoline comprising the following steps:

i) spraying a heavy feedstock oil into a riser reactor via a first nozzle to contact with a catalytic cracking catalyst, and subjecting it to a catalytic cracking reaction, ii) spraying a hydrogenated cycle oil into the riser reactor via a second nozzle to contact with a catalytic cracking catalyst, and subjecting it to a catalytic cracking reaction;

iii) separating a catalytic cracking reaction product from the riser reactor to obtain a catalytic cracking gasoline and a catalytic cracking light cycle oil;

iv) bringing the catalytic cracking light cycle oil or a fraction thereof into contact with a hydrogenation catalyst in a hydrogenation reactor, and subjecting it to a hydrotreatment to obtain a hydrogenated product; and v) recycling the hydrogenated product to the step ii) as the hydrogenated cycle oil, wherein said contacting with a catalytic cracking catalyst in the steps i) and ii) comprises contacting with a first catalytic cracking catalyst injected into the riser reactor at a first injection point located below the first nozzle, and a second catalytic cracking catalyst injected into the riser reactor at a second injection point located below the second nozzle, and wherein the second nozzle is spaced apart from the first nozzle along the height direction of the riser reactor, and the second injection point is different from the first injection point.

Preferably, along the height direction of the riser reactor, the second nozzle is disposed above the first nozzle, and the second catalytic cracking catalyst is injected into the riser reactor at the second injection point disposed at a position between the first nozzle and the second nozzle.

Further preferably, the reaction time in the riser reactor section between the first nozzle and the second nozzle may be in a range from about 0.05 to 2 seconds, preferably from about 0.1 to 1 second.

Preferably, the catalytic cracking light cycle oil may be split into a light fraction and a heavy fraction prior to the step iv), and the heavy fraction may be subjected to a hydrotreatment by contacting with the hydrogenation catalyst in the hydrogenation reactor in the step iv), to obtain the hydrogenated product. Further preferably, the light fraction may be recycled to the step ii), sprayed into the riser reactor via a separate third nozzle, or sprayed into the riser reactor via the second nozzle together with the hydrogenated product, and subjected to a catalytic cracking reaction by contacting with the catalytic cracking catalyst. Particularly preferably, along the height direction of the riser reactor, the third nozzle is disposed below the second nozzle, and further preferably, the second, third and first nozzles are disposed in a relative positional relationship of upper-middle-lower.

Preferably, the heavy feedstock oil may be selected from the group consisting of straight-run wax oil, coker wax oil, deasphalted oil, hydrorefined oil, hydrocracking tail oil, vacuum residue, atmospheric residue, and combinations thereof.

In such embodiments, the catalytic cracking reaction can be carried out under conditions well known to those skilled in the art. For example, the catalytic cracking conditions for the heavy feedstock oil may include: a reaction temperature (at the outlet of the riser reactor) ranging from about 450 to about 650° C., preferably from about 490 to about 550° C., an absolute pressure ranging from about 0.15 to about 0.4 MPa, a weight ratio of the total weight of the first and second catalytic cracking catalysts to the heavy feedstock oil ranging from about 1 to about 50, preferably from about 3 to about 30, a reaction time (from the first nozzle to the outlet of the riser reactor) ranging from about 1 to about 10 seconds, preferably from about 2 to about 8 seconds, a weight ratio of steam to the heavy feedstock ranging from about 0.01 to about 0.5, preferably from about 0.02 to about 0.2. The catalytic cracking conditions for the hydrogenated cycle oil may include: a reaction temperature (at the outlet of the riser reactor) ranging from about 450 to about 650° C., preferably from about 490 to about 550° C., an absolute pressure ranging from about 0.15 to about 0.4 MPa, a weight ratio of the total weight of the first and second catalytic cracking catalysts to the hydrogenated cycle oil ranging from about 5 to about 100, preferably from about 8 to about 50, a reaction time (from the second nozzle to the outlet of the riser reactor) ranging from about 1 to about 10 seconds, preferably from about 2 to about 8 seconds, a weight ratio of steam to the hydrogenated cycle oil ranging from about 0.01 to about 0.3, preferably from about 0.01 to about 0.1, with both the first catalytic cracking catalyst and the second catalytic cracking catalyst having a micro-activity of no less than about 60, preferably no less than about 62, as measured by the test method of RIPP 92-90 in catalytic cracking field for determining the micro-activity of equilibrium catalysts.

Preferably, the first catalytic cracking catalyst and the second catalytic cracking catalyst each independently comprises, on a dry basis, about 10% to about 50% by weight of a zeolite, about 5% to about 90% by weight of an inorganic oxide and about 0% to about 70% by weight of a clay, based on the weight of the catalytic cracking catalyst; the zeolite is selected from the group consisting of a Y zeolite with or without a rare earth element, an HY zeolite with or without a rare earth element, a USY zeolite with or without a rare earth element, a Beta zeolite with or without a rare earth element, and combinations thereof the inorganic oxide is selected from the group consisting of silica, alumina, and combinations thereof and the clay is selected from kaolin and/or halloysite.

Preferably, the riser reactor may be an equal-diameter riser reactor with or without a fluidized bed reactor, or a variable-diameter riser reactor with or without a fluidized bed reactor.

Preferably, the hydrogenation catalyst may comprise an active metallic component and a support, the active metallic component may be a Group VIB metal and/or a Group VIII non-noble metal, and the support may be selected from the group consisting of alumina, silica, amorphous silica-alumina, and combinations thereof.

Further preferably, the active metallic component may be nickel-tungsten, nickel-tungsten-cobalt, nickel-molybdenum or cobalt-molybdenum.

Still more preferably, the hydrogenation catalyst may comprise about 15% to about 30% by weight of the active metallic component and about 70% to about 85% by weight of the support.

Preferably, the hydrogenation conditions employed in the hydrogenation step iv) are as follows: a hydrogen partial pressure ranging from about 5.0 to about 22.0 MPa, preferably from about 8.0 to about 15.0 MPa, a reaction temperature ranging from about 330 to about 450° C., preferably from about 340 to about 380° C., a volume space velocity ranging from about 0.1 to about 10.0 $h^{-1}$, preferably from about 0.1 to about 3.0 $h^{-1}$, and a hydrogen-to-oil volume ratio ranging from about 100 to about 2000 $Nm^3/m^3$, preferably from about 350 to about 1200 $Nm^3/m^3$.

Preferably, the product obtained in the step iv) may be separated to provide a fraction having an initial boiling point greater than about 165° C., preferably greater than about 170° C., or a fraction having an initial boiling point greater than about 250° C., preferably greater than about 260° C. that can be used as the hydrogenated product (which may also be referred to as a hydrogenated light cycle oil or a hydrogenated heavy fraction depending on the feedstock used in the hydrogenation). Further preferably, the step iv) may be carried out to an extent that the hydrogenated product has a bicyclic aromatics content of no more than about 20% by weight, preferably no more than about 10% by weight, more preferably no more than about 8% by weight, and a hydrogen content of no less than about 10% by weight, preferably no less than about 11% by weight, more preferably no less than about 14% by weight.

Optionally, a catalytic cracking light cycle oil from an external source or a fraction thereof may also be subjected to a hydrotreatment in the step iv), and the resultant hydrogenated product may be recycled to the step ii) as the hydrogenated cycle oil to conduct a catalytic cracking reaction, so as to enlarge the source of starting materials and produce more high-octane gasoline.

Preferably, the weight ratio of the first catalytic cracking catalyst to the second catalytic cracking catalyst (i.e., the cyclic weight ratio per unit time) is in a range from about 1:0.02 to about 1:1, preferably from about 1:0.03 to about 1:0.5.

Such embodiments of the present application may bring about one or more of the following advantages:

1. a complete elimination of the production of light cycle oil may be achieved;
2. by feeding the heavy feedstock oil and the hydrogenated cycle oil to a single riser reactor at different heights thereof and providing a supplementary catalytic cracking catalyst, the two feedstock oils may be processed separately, which may allow an optimization of the reaction conditions employed for the two feedstock oils individually, and in turn result in a maximum conversion thereof, so as to maximize the production of catalytic cracking gasoline with a high octane number; and
3. by feeding the hydrogenated cycle oil downstream of the heavy feedstock oil, the reaction time of the hydrogenated cycle oil may be effectively shortened, so that the yield of high-octane gasoline may be further increased.

The first kind of particular embodiments of the process according to the present application will be further described below with reference to the accompanying drawings, which is not intended to limit the present invention.

As shown in FIG. 1, in a preferred embodiment of the process according to the present application, a heavy feedstock oil is passed through a heavy feedstock oil pipeline 105 and fed into a riser reactor 119 via a first nozzle 107, a catalytic cracking light cycle oil is sent to a hydrogenation reactor 103 through a light cycle oil pipeline 101, and hydrogen is introduced into the hydrogenation reactor 103 through a hydrogen pipeline 102. The resultant hydrogenated product (i.e., the hydrogenated cycle oil) is passed through a hydrogenated cycle oil pipeline 104 and fed into the riser reactor 119 via a second nozzle 106. A portion of a regenerated catalyst from a regenerator 113 is passed through a first regenerated catalyst sloped tube 110 under the control of a first regenerated catalyst slide valve 111, injected into the bottom of the riser reactor 119 at a first injection point as a first catalytic cracking catalyst, and lifted by a pre-lifting medium. After entering a heavy feedstock oil reaction zone I, the catalyst is contacted with the heavy feedstock oil fed through the first nozzle 107, and upraised, to conduct a catalytic cracking reaction. Then, the resultant mixture of oil gas and catalyst enters a hydrogenated cycle oil reaction zone II, and is contacted with the hydrogenated cycle oil fed through the second nozzle 106, and upraised, to conduct a catalytic cracking reaction. Another portion of the regenerated catalyst from the regenerator 113 is passed through a second regenerated catalyst sloped tube 108 under the control of a second regenerated catalyst slide valve 109, and injected into the riser reactor 119 at a second injection point disposed at a position between the first nozzle 107 and the second nozzle 106 as a second catalytic cracking catalyst, so as to enhance the cracking reaction of the hydrogenated cycle oil in the hydrogenated cycle oil reaction zone II. Along the height direction of the riser reactor 119, the second nozzle 106 and the first nozzle 107 are disposed in a relative positional relationship of up-down. A catalytic cracking reaction product and a spent catalyst are withdrawn from the top of the riser reactor 119 and sent to a disengager 112 for separation of the reaction product and the catalyst. The separated spent catalyst is passed to the regenerator 113 for regeneration and then recycled. The separated reaction product is sent to a fractionation column 118 through a product pipeline 114. The resultant slurry oil is withdrawn from the fractionation column 118 through a slurry oil pipeline 117 and discharged as a product; the resultant oil gas is withdrawn from the fractionation column 118 through an oil-gas pipeline 115 and passed to a subsequent absorption stabilization system (not shown) to produce a dry gas, a liquefied gas and a high-octane gasoline; and the resultant catalytic cracking light cycle oil is withdrawn from the fractionation column 118 through a recycle pipeline 116, sent to the hydrogenation reactor 103 through the light cycle oil pipeline 101, and then recycled.

As shown in FIG. 2, in a further preferred embodiment of the process according to the present application, a heavy feedstock oil is passed through a heavy feedstock oil pipeline 205 and fed into a riser reactor 221 via a first nozzle 208, a heavy fraction of a catalytic cracking light cycle oil is sent to a hydrogenation reactor 203 through a heavy fraction pipeline 201, and hydrogen is introduced into the hydrogenation reactor 203 through a hydrogen pipeline 202. The resultant hydrogenated product (i.e., the hydrogenated cycle oil) is passed through a hydrogenated cycle oil pipeline 204 and fed into the riser reactor 221 via a second nozzle 206, and a light fraction of the catalytic cracking light cycle oil is passed through a light fraction pipeline 219 and fed into the riser reactor 221 through a third nozzle 207. A portion of a regenerated catalyst from a regenerator 214 is passed through a first regenerated catalyst sloped tube 212 under the control of a first regenerated catalyst slide valve 211, injected into the bottom of the riser reactor 221 at a first injection point as a first catalytic cracking catalyst, and lifted by a pre-lifting medium. After entering a heavy feedstock oil reaction zone I, the catalyst is contacted with the heavy feedstock oil fed through the first nozzle 208, and upraised, to conduct a catalytic cracking reaction. Then, the resultant mixture of oil gas and catalyst enters a hydrogenated cycle oil reaction zone II, and is contacted with the hydrogenated cycle oil fed through the second nozzle 206 and the light fraction of the catalytic cracking light cycle oil fed through the third nozzle 207, and upraised, to conduct a catalytic cracking reaction. Another portion of the regenerated catalyst from the regenerator 214 is passed through a second regenerated catalyst sloped tube 209 under the control of a second regenerated catalyst slide valve 210, and injected into the riser reactor 221 at a second injection point disposed at a position between the first nozzle 208 and the second nozzle 206 as a second catalytic cracking catalyst, so as to enhance the cracking reaction of the hydrogenated cycle oil and the light fraction in the hydrogenated cycle oil reaction zone II. Along the height direction of the riser reactor 221, the second nozzle 206, the third nozzle 207, and the first nozzle 208 are disposed in a relative positional relationship of upper-middle-lower. A catalytic cracking reaction product and a spent catalyst are withdrawn from the top of the riser reactor 221 and sent to a disengager 213 for separation of the reaction product and the catalyst. The separated spent catalyst is passed to the regenerator 214 for regeneration and then recycled. The separated reaction product is sent to a main fractionation column 217 through a product pipeline 215. The resultant slurry oil is withdrawn from the main fractionation column 217 through a slurry oil pipeline 222, and discharged as a product; the resultant oil gas is withdrawn from the main fractionation column 217 through an oil-gas pipeline 216, and passed to a subsequent absorption stabilization system (not shown) to produce a dry gas, a liquefied gas and a high-octane gasoline; and the resultant catalytic cracking light cycle oil is withdrawn from the main fractionation column 217 and split in a light cycle oil fractionation column 218 to obtain the light fraction and the heavy faction. The heavy fraction of the catalytic cracking light cycle oil withdrawn through the recycle pipeline 220 is sent to the hydrogenation reactor 203 through the heavy fraction pipeline 201, and then recycled. The light fraction of the catalytic cracking light cycle oil withdrawn through the light fraction pipeline 219 is fed into the riser reactor 221 via the third nozzle 207.

In a second kind of particular embodiments, the present application provides a process for producing catalytic cracking gasoline comprising the following steps:

i) spraying a heavy feedstock oil into a primary riser reactor via a first nozzle to contact with a first catalytic cracking catalyst injected into the primary riser reactor at a first injection point located below the first nozzle, and subjecting it to a catalytic cracking reaction to obtain a first reaction product;

ii) spraying a hydrogenated cycle oil into a secondary riser reactor via a second nozzle to contact with a second catalytic cracking catalyst injected into the secondary riser reactor at a second injection point located below the second nozzle, and subjecting it to a catalytic cracking reaction to obtain a second reaction product;

iii) separating a mixture of the first reaction product and the second reaction product to obtain a catalytic cracking gasoline and a catalytic cracking light cycle oil;

iv) bringing the catalytic cracking light cycle oil or a fraction thereof into contact with a hydrogenation catalyst in a hydrogenation reactor, and subjecting it to a hydrotreatment to obtain a hydrogenated product; and v) recycling the hydrogenated product to the step ii) as the hydrogenated cycle oil, wherein the second reaction product is sent to the upper middle portion of the primary riser reactor, where it is mixed with the first reaction product, and the mixture obtained from the top of the primary riser reactor is separated in the step iii).

Preferably, the catalytic cracking light cycle oil may be split into a light fraction and a heavy fraction prior to the step iv), and the heavy fraction may be subjected to a hydrotreatment in the step iv) by contacting with the hydrogenation catalyst in the hydrogenation reactor to obtain the hydrogenated product. Further preferably, the light fraction may be recycled to the step ii), sprayed into the secondary riser reactor via a separate third nozzle, or sprayed into the secondary riser reactor via the second nozzle together with the hydrogenated product, and subjected to a catalytic cracking reaction therein. Particularly preferably, the third nozzle is disposed below the second nozzle along the height direction of the secondary riser reactor.

In such embodiments, the catalytic cracking reaction may be carried out under conditions well known to those skilled in the art. For example, the reaction conditions in the primary riser reactor may include: a reaction temperature ranging from about 450 to about 550° C., preferably from about 500 to about 520° C., a weight ratio of the first catalytic cracking catalyst to the heavy feedstock oil ranging from about 4 to about 8, preferably from about 5 to about 7, a reaction time ranging from about 2 to about 10 seconds, preferably from about 2 to about 8 seconds, an absolute pressure ranging from about 0.15 to about 0.4 MPa, a weight ratio of steam to the heavy feedstock oil ranging from about 0.02 to about 0.08, preferably from about 0.03 to about 0.05, and a micro-activity of the first catalytic cracking catalyst of no less than about 60, preferably no less than about 62, as measured by the test method of RIPP 92-90 in catalytic cracking field for determining the micro-activity of equilibrium catalysts. The reaction conditions in the secondary riser reactor may include: a reaction temperature ranging from about 520 to about 650° C., preferably from about 550 to about 590° C., an absolute pressure ranging from about 0.15 to about 0.4 MPa, a weight ratio of the second catalytic cracking catalyst to the hydrogenated cycle oil ranging from about 5 to about 100, preferably from about 8 to about 50, a reaction time ranging from about 1 to about 10 seconds, preferably from about 1 to about 8 seconds, a weight ratio of steam to the hydrogenated cycle oil ranging from about 0.01 to about 0.3, preferably from about 0.02 to about 0.2, and a micro-activity of the second catalytic cracking catalyst of no less than about 60, preferably no less than about 62.

Preferably, the first catalytic cracking catalyst and the second catalytic cracking catalyst each independently comprises, on a dry basis, about 10% to about 50% by weight of a zeolite, about 5% to about 90% by weight of an inorganic oxide and about 0% to about 70% by weight of a clay, based on the weight of the catalytic cracking catalyst; the zeolite is selected from the group consisting of a Y zeolite with or without a rare earth element, an HY zeolite with or without a rare earth element, a USY zeolite with or without a rare earth element, a Beta zeolite with or without a rare earth element, and combinations thereof; the inorganic oxide is selected from the group consisting of silica, alumina, and combinations thereof; and the clay is selected from kaolin and/or halloysite.

Preferably, the heavy feedstock oil may be selected from the group consisting of straight-run wax oil, coker wax oil, deasphalted oil, hydrorefined oil, hydrocracking tail oil, vacuum residue, atmospheric residue, and combinations thereof.

Preferably, the primary riser reactor and the secondary riser reactor may each independently be an equal-diameter riser reactor with or without a fluidized bed reactor, or a variable-diameter riser reactor with or without a fluidized bed reactor.

Preferably, the primary riser reactor may comprise a first reaction section and a second reaction section that are coaxially arranged from bottom to top, with the inner diameter of the second reaction section being larger than that of the first reaction section, and the outlet of the secondary riser reactor is connected to the second reaction zone via a horizontal pipe.

In such embodiments, if the height of the primary riser reactor is set as h, the upper middle portion of the primary riser reactor generally refers to the portion of the riser reactor at a height of about ⅓ h or above, preferably from about ⅓ h or above to about ⅘ h or below.

Preferably, the hydrogenation catalyst used in the step iv) may comprise an active metallic component and a support, the active metallic component may be a Group VIB metal and/or a Group VIII non-noble metal, and the support may be selected from the group consisting of alumina, silica, amorphous silica-alumina, and combinations thereof. Further preferably, the active metallic component may be nickel-tungsten, nickel-tungsten-cobalt, nickel-molybdenum or cobalt-molybdenum.

Still more preferably, the hydrogenation catalyst may comprise about 15% to about 30% by weight of the active metallic component and about 70% to about 85% by weight of the support.

Preferably, the hydrotreatment conditions employed in the step iv) are as follows: a hydrogen partial pressure ranging from about 5.0 to about 22.0 MPa, preferably from about 8.0 to about 15.0 MPa, a reaction temperature ranging from about 330 to about 450° C., preferably from about 340 to about 380° C., a volume space velocity ranging from about 0.1 to about 10.0 h$^{-1}$, preferably from about 0.1 to about 3.0 h$^{-1}$, and a hydrogen-to-oil volume ratio ranging from about 100 to about 2000 Nm$^3$/m$^3$, preferably from about 350 to about 1200 Nm$^3$/m$^3$.

Preferably, the product obtained in the step iv) may be separated to provide a fraction having an initial boiling point greater than about 165° C., preferably greater than about 170° C., or a fraction having an initial boiling point greater than about 250° C., preferably greater than about 260° C. that can be used as the hydrogenated product (which may also be referred to as a hydrogenated light cycle oil or a hydrogenated heavy fraction depending on the feedstock used in the hydrogenation). Further preferably, the step iv) is carried out to an extent that the hydrogenated product has a bicyclic aromatics content of no more than about 20% by weight, preferably no more than about 10% by weight, more preferably no more than about 8% by weight, and a hydrogen content of no less than about 10% by weight, preferably no less than about 11% by weight, more preferably no less than about 14% by weight.

Optionally, a catalytic cracking light cycle oil from an external source or a fraction thereof may also be subjected to a hydrotreatment in the step iv), and the resultant hydrogenated product may be recycled to the step ii) as the hydrogenated cycle oil to conduct a catalytic cracking reaction, so as to enlarge the source of starting materials and produce more high-octane gasoline.

Such embodiments of the present application may bring about one or more of the following advantages:

1. a complete elimination of the production of light cycle oil may be achieved; and 2. by processing the heavy feedstock oil and the hydrogenated cycle oil separately in the primary and secondary riser reactors, different reaction conditions may be employed in those riser reactors, so that an optimization may be conducted to meet the harsh conditions required for the catalytic cracking of the hydrogenated cycle oil; and, meanwhile, by connecting the outlet of the secondary riser reactor directly to the upper middle portion of the primary riser reactor, the reaction time of the hydrogenated cycle oil may be shortened, so as to maximize the production of catalytic cracking gasoline with a high octane number.

The second kind of particular embodiments of the present application will be further described below with reference to the accompanying drawings, which is not intended to limit the present invention.

As shown in FIG. 3, in a preferred embodiment of the process according to the present application, a heavy feedstock oil is fed into a primary riser reactor 301 via a first nozzle 307, a catalytic cracking light cycle oil is sent to a hydrogenation reactor 302 through a light cycle oil pipeline 312, and hydrogen is introduced into the hydrogenation reactor 302 through a hydrogen pipeline 313. The resultant hydrogenated product (i.e., the hydrogenated cycle oil) is passed through a hydrogenated cycle oil pipeline 316 and fed into a secondary riser reactor 304 via a second nozzle 308. A portion of a regenerated catalyst from a regenerator 305 is passed through a first regenerated catalyst sloped tube 310, injected into the bottom of the primary riser reactor 301 at a first injection point as a first catalytic cracking catalyst, and lifted by a pre-lifting medium. Then, the catalyst is contacted with the heavy feedstock oil fed through the first nozzle 307, and upraised, to conduct a catalytic cracking reaction. Another portion of the regenerated catalyst from the regenerator 305 is passed through a second regenerated catalyst sloped tube 309, injected into the bottom of the secondary riser reactor 304 at a second injection point as a second catalytic cracking catalyst, and lifted by a pre-lifting medium. Then, the catalyst is contacted with the hydrogenated cycle oil fed through the second nozzle 308, and upraised, to conduct a catalytic cracking reaction. The resultant reaction stream (including the second reaction product and the spent catalyst) is withdrawn from the top outlet of the secondary riser reactor 304, sent to the upper middle portion of the primary riser reactor 301 through a horizontal pipe, and combined with the stream therein. A catalytic cracking reaction product and a spent catalyst are withdrawn from the top of the primary riser reactor 301 and sent to a disengager 306 for separation of the reaction product and the catalyst. The separated spent catalyst is passed to the regenerator 305 for regeneration and then recycled. The separated reaction product is sent to a fractionation column 303 through a product pipeline 317. The result slurry oil is withdrawn from the fractionation column 303 through a slurry oil pipeline 315, and discharged as a product; the resultant oil gas is withdrawn from the fractionation column 303 through an oil-gas pipeline 314, and passed to a subsequent absorption stabilization system (not shown) to produce a dry gas, a liquefied gas and a high-octane gasoline; and the resultant catalytic cracking light cycle oil is withdrawn from the fractionation column 303 through a recycle pipeline 311, sent to the hydrogenation reactor 302 through the light cycle oil pipeline 312, and then recycled.

As shown in FIG. 4, in a further preferred embodiment of the process according to the present application, a heavy feedstock oil is fed into a primary riser reactor 401 via a first nozzle 407, a heavy fraction of a catalytic cracking light cycle oil is sent to a hydrogenation reactor 420 through a heavy fraction pipeline 413, and hydrogen is introduced to the hydrogenation reactor 420 via a hydrogen pipeline 416. The resultant hydrogenated product (i.e., the hydrogenated cycle oil) is passed through a hydrogenated cycle oil pipeline 412 and fed into a secondary riser reactor 404 via a second nozzle 408, and a light fraction of the catalytic cracking light cycle oil is passed through a light fraction pipeline 418 and fed into the secondary riser reactor 404 via a third nozzle 419. A portion of a regenerated catalyst from a regenerator 405 is passed through a first regenerated catalyst sloped tube 410, injected into the bottom of the primary riser reactor 401 at a first injection point as a first catalytic cracking catalyst, and lifted by a pre-lifting medium. Then, the catalyst is contacted with the heavy feedstock oil fed through the first nozzle 407, and upraised, to conduct a catalytic cracking reaction. Another portion of the regenerated catalyst from the regenerator 405 is passed through a second regenerated catalyst sloped tube 409, injected into the bottom of the secondary riser reactor 404 at a second injection point as a second catalytic cracking catalyst, and lifted by a pre-lifting medium. Then, the catalyst is contacted with the hydrogenated cycle oil fed through the second nozzle 408 and the light fraction of the catalytic cracking light cycle oil fed through the third nozzle 419, and upraised, to conduct a catalytic cracking reaction. The resultant reaction stream (including the second reaction product and the spent catalyst) is withdrawn from the top outlet of the secondary riser reactor 404, sent to the upper middle portion of the primary riser reactor 401 through a horizontal pipe, and combined with the stream therein. Along the height direction of the secondary riser reactor 404, the second nozzle 408 and the third nozzle 419 are disposed in a relative positional relationship of up-down. A catalytic cracking reaction product and a spent catalyst are withdrawn from the top of the primary riser reactor 401 and sent to a disengager 406 for separation of the reaction product and the catalyst. The separated spent catalyst is passed to the regenerator 405 for regeneration and then recycled. The separated reaction product is sent to a main fractionation column 403 through a product pipeline 417. The resultant slurry oil is withdrawn from the main fractionation column 403 through a slurry oil pipeline 415, and discharged as a product; the resultant oil gas is withdranw from the main fractionation column 403 through an oil-gas pipeline 414, and passed to a subsequent absorption stabilization system (not shown) to produce a dry gas, a liquefied gas and a high-octane gasoline; and the resultant catalytic cracking light cycle oil is withdrawn from the main fractionation column 403, and sent to a light cycle oil fractionation column 402 through a light cycle oil pipeline 411, where it is split into a light fraction and a heavy fraction. The heavy fraction of the catalytic cracking light cycle oil is sent to the hydrogenation reactor 420 through the heavy fraction pipeline 413, and then recycled. The light fraction of the catalytic cracking light cycle oil withdrawn through the light fraction pipeline 418 is fed into the secondary riser reactor 404 via the third nozzle 419.

In a second aspect, the present application provides a catalytic cracking system comprising a primary riser reactor, a secondary riser reactor, a regenerator, a disengager, a fractionation column, and a hydrogenation reactor, wherein:

the primary riser reactor is provided with a lower feed inlet, a bottom catalyst inlet and a top outlet, the secondary riser reactor is provided with a lower feed inlet, a bottom catalyst inlet and a top outlet, and the top outlet of the secondary riser reactor is connected to the upper middle portion of the primary riser reactor via a horizontal pipe.

the top outlet of the primary riser reactor is connected to an inlet of the disengager, a catalyst outlet of the disengager is connected to the regenerator, an oil-gas outlet of the disengager is connected to an inlet of the fractionation column, a light cycle oil outlet of the fractionation column is connected to an inlet of the hydrogenation reactor, and a hydrogenated product outlet of the hydrogenation reactor is connected to the feed inlet of the secondary riser reactor, a regenerated catalyst outlet of the regenerator is connected to the catalyst inlet of the primary riser reactor and the catalyst inlet of the secondary riser reactor, respectively.

In a preferred embodiment, the primary riser reactor comprises a first reaction section and a second reaction section that are coaxially arranged from bottom to top, with the inner diameter of the second reaction section being larger than that of the first reaction section, and the top outlet of the secondary riser reactor is connected to the second reaction section via a horizontal pipe The above catalytic cracking system according to the present application will be further described below with reference to the accompanying drawings, which is not intended to limit the present invention.

As shown in FIG. 3, in a preferred embodiment, the catalytic cracking system according to the present application comprises a primary riser reactor 301, a secondary riser reactor 304, a regenerator 305, a disengager 306, a fractionation column 303, and a hydrogenation reactor 302. The primary riser reactor 301 is provided with a lower feed inlet (i.e., the first nozzle 307), a bottom catalyst inlet and a top outlet, and the secondary riser reactor 304 is provided with a lower feed inlet (i.e., the second nozzle 308), a bottom catalyst inlet and a top outlet. The top outlet of the secondary riser reactor 304 is connected to the upper middle portion of the primary riser reactor 301 through a horizontal pipe. The top outlet of the primary riser reactor 301 is connected to an inlet of the disengager 306. A catalyst outlet of the disengager 306 is connected to the regenerator 305, and an oil-gas outlet of the disengager 306 is connected to an inlet of the fractionation column 303. A light cycle oil outlet of the fractionation column 303 is connected to an inlet of the hydrogenation reactor 302. A hydrogenated product outlet of the hydrogenation reactor 302 is connected to a feed inlet of the secondary riser reactor 304. A catalyst outlet of the regenerator 305 is connected to the catalyst inlet of the primary riser reactor 301 and the catalyst inlet of the secondary riser reactor 304, respectively.

Further, as shown in FIG. 3, the primary riser reactor 301 comprises a first reaction section I and a second reaction section II that are coaxially arranged from bottom to top, with the inner diameter of the second reaction section II being larger than that of the first reaction section I, and the top outlet of the secondary riser reactor 304 is connected to the second reaction stage II via a horizontal pipe. In addition, an outlet section may be coaxially provided above the second reaction section II. The inner diameter of the outlet section may be smaller than that of the second reaction section II, and the outlet section is connected to the disengager 306.

In a third aspect, the present application provides a catalytic cracking system comprising a primary riser reactor, a secondary riser reactor, a regenerator, a disengager, a main fractionation column, a light cycle oil fractionation column, and a hydrogenation reactor, wherein:

the primary riser reactor is provided with a lower feed inlet, a bottom catalyst inlet and a top outlet, the secondary riser reactor is provided with a first feed inlet and a second feed inlet at a lower portion, a bottom catalyst inlet and a top outlet, and the top outlet of the secondary riser reactor is connected to the upper middle portion of the primary riser reactor via a horizontal pipe, the top outlet of the primary riser reactor is connected to an inlet of the disengager, a catalyst outlet of the disengager is connected to the regenerator, an oil-gas outlet of the disengager is connected to an inlet of the main fractionation column, and a light cycle oil outlet of the main fractionation column is connected to an inlet of the light cycle oil fractionation column, a heavy fraction outlet of the light cycle oil fractionation column is connected to an inlet of the hydrogenation reactor, a light fraction outlet of the light cycle oil fractionation column is connected to the second feed inlet of the secondary riser reactor, and a hydrogenated product outlet of the hydrogenation reactor is connected to the first feed inlet of the secondary riser reactor, and a regenerated catalyst outlet of the regenerator is connected to the catalyst inlet of the primary riser reactor and the catalyst inlet of the secondary riser reactor, respectively.

In a preferred embodiment, the primary riser reactor comprises a first reaction section and a second reaction section that are coaxially arranged from bottom to top, with the inner diameter of the second reaction section being larger than that of the first reaction section, and the outlet of the secondary riser reactor is connected to the second reaction section via a horizontal pipe.

The above catalytic cracking system according to the present application will be further described below with reference to the accompanying drawings, which is not intended to limit the present invention.

As shown in FIG. 4, in a preferred embodiment, the catalytic cracking system according to the present application comprises a primary riser reactor 401, a secondary riser reactor 404, a regenerator 405, a disengager 406, a main fractionation column 403, a light cycle oil fractionation column 402 and a hydrogenation reactor 420. The primary riser reactor 401 is provided with a lower feed inlet (i.e., the first nozzle 407), a bottom catalyst inlet and a top outlet. The secondary riser reactor 404 is provided with a first feed inlet (i.e., the second nozzle 408) and a second feed inlet (i.e., the third nozzle 419) at a lower portion, a bottom catalyst inlet, and a top outlet. The top outlet of the secondary riser reactor 404 is connected to the upper middle portion of the primary riser reactor 401 via a horizontal pipe, and the top outlet of the primary riser reactor 401 is connected to an inlet of the disengager 406. A catalyst outlet of the disengager 406 is connected to the regenerator 405, and an oil-gas outlet of the disengager 406 is connected to an inlet of the main fractionation column 403. A light cycle oil outlet of the main fractionation column 403 is connected to an inlet of the light cycle oil fractionation column 402. A heavy fraction outlet of the light cycle oil fractionation column 402 is connected to an inlet of the hydrogenation reactor 420, and a light fraction outlet of the light cycle oil fractionation column 402 is connected to the second feed inlet of the secondary riser reactor 404. A hydrogenated product outlet of the hydrogenation reactor 420 is connected to the first feed inlet of the secondary riser reactor 404. A catalyst outlet of the regenerator 405 is connected to the catalyst inlet of the primary riser reactor 401 and the catalyst inlet of the secondary riser reactor 404, respectively.

Further, as shown in FIG. 4, the primary riser reactor 401 comprises a first reaction section I and a second reaction section II that are coaxially arranged from bottom to top, with the inner diameter of the second reaction section II being larger than that of the first reaction section I, and the top outlet of the secondary riser reactor 404 is connected to the second reaction stage II via a horizontal pipe. In addition, an outlet section may be coaxially provided above the second reaction section II. The inner diameter of the outlet section may be smaller than that of the second reaction section II, and the outlet section is connected to the disengager 406.

In some preferred embodiments, the present application provides the following technical solutions:

A1. A process for producing high-octane gasoline, comprising the steps of:

spraying a heavy feedstock oil into a riser reactor via a first nozzle to contact with a first catalytic cracking catalyst from the bottom of the riser reactor and a second catalytic cracking catalyst from the middle of the riser reactor, and subjecting it to a catalytic cracking reaction, to obtain a reaction product and a spent catalyst;

separating the reaction product to obtain at least a catalytic cracking gasoline and a catalytic cracking light cycle oil;

sending the spent catalyst to a regenerator for regeneration by burning off the coke, to obtain a regenerated catalyst;

recycling the regenerated catalyst to the riser reactor as the first catalytic cracking catalyst and the second catalytic cracking catalyst;

bringing the catalytic cracking light cycle oil into contact with a hydrogenation catalyst in a hydrogenation reactor, and subjecting it to a hydrotreatment to obtain a hydrogenated light cycle oil; and spraying the hydrogenated light cycle oil into the riser reactor via a second nozzle, and subjecting it to a catalytic cracking reaction, wherein the second nozzle is spaced apart from the first nozzle along a height direction of the riser reactor.

A2. The process according to item A1, wherein, along the height direction, the second nozzle is disposed above the first nozzle, and the second catalytic cracking catalyst is injected into the riser reactor at a position above the second nozzle or between the first nozzle and the second nozzle.

A3. The process according to item A1 or A2, wherein the reaction time in the riser reactor section between the first nozzle and the second nozzle is in a range from about 0.05 to about 2 seconds.

A4. The process according to item A1, wherein the heavy feedstock oil is at least one selected from the group consisting of straight-run wax oil, coker wax oil, deasphalted oil, hydrorefined oil, hydrocracking tail oil, vacuum residue, and atmospheric residue.

A5. The process according to item A1, wherein the catalytic cracking conditions for the heavy feedstock oil include: a reaction temperature ranging from about 520 to about 650° C., an absolute pressure ranging from about 0.15 to about 0.4 MPa, a weight ratio of the total weight of the first and second catalytic cracking catalysts to the heavy feedstock oil ranging from about 1 to about 50, a reaction time ranging from about 1 to about 10 seconds, a weight ratio of steam to the heavy feedstock oil ranging from about 0.01 to 0.5, and a micro-activity of the regenerated catalyst of no less than about 60, as measured by the test method of RIPP 92-90 in catalytic cracking field for determining the micro-activity of equilibrium catalysts.

A6. The process according to item A1, wherein the regenerated catalyst comprises about 10% to about 50% by weight of a zeolite, about 5% to about 90% by weight of an inorganic oxide, and about 0% to about 70% by weight of a clay, and the zeolite is at least one selected from the group consisting of a Y zeolite with or without a rare earth element, an HY zeolite with or without a rare earth element, a USY zeolite with or without a rare earth element, and a Beta zeolite with or without a rare earth element.

A7. The process according to item A1, wherein the riser reactor is an equal-diameter riser reactor with or without a fluidized bed reactor, or a variable-diameter riser reactor with or without a fluidized bed reactor.

A8. The process according to item A1, wherein the hydrogenation catalyst comprises an active metallic component and a support, the active metallic component is a Group VIB metal and/or a Group VIII non-noble metal, and the support is at least one selected from the group consisting of alumina, silica, and amorphous silica-alumina.

A9. The process according to item A8, wherein the active metallic component is nickel-tungsten, nickel-tungsten-cobalt, nickel-molybdenum or cobalt-molybdenum.

A10. The process according to item A1, wherein the hydrotreatment conditions are as follows: a hydrogen partial pressure ranging from about 5.0 to about 22.0 MPa, a reaction temperature ranging from about 330 to about 450° C., a volume space velocity ranging from about 0.1 to about 10.0 $h^{-1}$, and a hydrogen-to-oil volume ratio ranging from about 100 to about 2000 $Nm^3/m^3$.

A11. The process according to item A1, wherein the hydrogenated light cycle oil has a bicyclic aromatics content of no more than about 20% by weight.

A12. The process according to item A1, wherein the catalytic cracking conditions for the hydrogenated light cycle oil include: a reaction temperature ranging from about 520 to about 650° C., an absolute pressure ranging from about 0.15 to about 0.4 MPa, a weight ratio of the total weight of the first and second catalytic cracking catalysts to the hydrogenated light cycle oil ranging from about 5 to about 100, a reaction time ranging from about 1 to about 10 seconds, and a weight ratio of steam to the hydrogenated light cycle oil ranging from about 0.01 to about 0.3.

A13. The process according to item A1, wherein the cyclic weight ratio of the first catalytic cracking catalyst and the second catalytic cracking catalyst per unit time is in a range from about 1:0.02 to about 1:1.

B1. A catalytic cracking process using two riser reactors, comprising the steps of:
spraying a heavy feedstock oil into a lower portion of a primary riser reactor via a first nozzle to contact with a first catalytic cracking catalyst from the bottom of the primary riser reactor, subjecting it to a first catalytic cracking reaction to obtain a first reaction product and a first spent catalyst, and withdrawing the resultant from a top outlet of the primary riser reactor;
separating the first reaction product in a product separation unit to obtain at least a catalytic cracking gasoline and a catalytic cracking light cycle oil;
bringing the catalytic cracking light cycle oil into contact with a hydrogenation catalyst in a hydrogenation reactor, and subjecting it to a hydrotreatment to obtain a hydrogenated light cycle oil;
spraying the hydrogenated light cycle oil into a secondary riser reactor via a second nozzle to contact with a second catalytic cracking catalyst, and subjecting it to a second catalytic cracking reaction, to obtain a second reaction product and a second spent catalyst, wherein a top outlet of the secondary riser reactor is connected to the upper middle portion of the primary riser reactor via a horizontal pipe;
sending the second reaction product and the second spent catalyst to the upper middle portion of the primary riser reactor, and withdrawing them from the top outlet of the primary riser reactor together with the first reaction product and the first spent catalyst;
sending the first spent catalyst and the second spent catalyst to a regenerator for regeneration by burning off the coke to obtain a regenerated catalyst, and recycling the regenerated catalyst to the primary riser reactor and the secondary riser reactor, separately, as the first catalytic cracking catalyst and the second catalytic cracking catalyst; and
separating the second reaction product together with the first reaction product in a product separation unit.

B2. The process according to item B1, wherein the heavy feedstock oil is at least one selected from the group consisting of straight-run wax oil, coker wax oil, deasphalted oil, hydrorefined oil, hydrocracking tail oil, vacuum residue, and atmospheric residue.

B3. The process according to item B 1, wherein the conditions for the first catalytic cracking reaction include: a temperature ranging from about 450 to about 550° C., a weight ratio of the first catalytic cracking catalyst to the heavy feedstock oil ranging from about 4 to about 8, a reaction time ranging from about 2 to about 10 seconds, a pressure ranging from about 0.15 to about 0.4 MPa, a weight ratio of steam to the heavy feedstock oil ranging from about 0.02 to about 0.08, and a micro-activity of the first catalytic cracking catalyst of no less than about 60, as measured by the test method of RIPP 92-90 in catalytic cracking field for determining the micro-activity of equilibrium catalysts.

B4. The process of item B1, wherein the first catalytic cracking catalyst and the second catalytic cracking catalyst each independently comprises about 10% to about 50% by weight of a zeolite, about 5% to about 90% by weight of an inorganic oxide, and about 0% to about 70% by weight of a clay, and the zeolite is at least one selected from the group consisting of a Y zeolite with or without a rare earth element, an HY zeolite with or without a rare earth element, a USY zeolite with or without a rare earth element, and a Beta zeolite with or without a rare earth element.

B5. The process according to item B1, wherein the primary riser reactor and the secondary riser reactor are each independently an equal-diameter riser reactor with or without a fluidized bed reactor, or a variable-diameter riser reactor with or without a fluidized bed reactor.

B6. The process according to item B1, wherein the primary riser reactor comprises a first reaction section and a second reaction section that are coaxially arranged from bottom to top, with the inner diameter of the second reaction section being larger than that of the first reaction section, and the outlet of the secondary riser reactor is connected to the second reaction section via a horizontal pipe.

B7. The process according to item B1, wherein the hydrogenation catalyst comprises an active metallic component and a support, the active metallic component is a Group VIB metal and/or a Group VIII non-noble metal, and the support is at least one selected from the group consisting of alumina, silica, and amorphous silica-alumina.

B8. The process according to item B7, wherein the active metallic component is nickel-tungsten, nickel-tungsten-cobalt, nickel-molybdenum or cobalt-molybdenum.

B9. The process according to item B1, wherein the hydrotreatment conditions are as follows: a hydrogen partial pressure ranging from about 5.0 to about 22.0 MPa, a reaction temperature ranging from about 330 to about 450° C., a volume space velocity ranging from about 0.1 to about 10.0 $h^{-1}$, and a hydrogen-to-oil volume ratio ranging from about 100 to about 2000 $Nm^3/m^3$.

B10. The process according to item B1, wherein the hydrogenated light cycle oil has a bicyclic aromatics content of no more than about 20% by weight.

B11. The process according to item B 1, wherein the conditions for the second catalytic cracking reaction include: a reaction temperature ranging from about 520 to about 650° C., a pressure ranging from about 0.15 to about 0.4 MPa, a weight ratio of the second catalytic cracking catalyst to the hydrogenated light cycle oil ranging from about 5 to about 100, a reaction time ranging from about 1 to about 10 seconds, a weight ratio of steam to the hydrogenated light cycle oil ranging from about 0.01 to about 0.3, and a micro-activity of the second catalytic cracking catalyst of no less than about 60.

B12. A catalytic cracking system using two riser reactors, comprising a primary riser reactor 301, a hydrogenation reactor 302, a product separation unit (i.e., a fractionation column) 303, a secondary riser reactor 304, a regenerator 305 and a disengager 306;

the primary riser reactor 301 is provided with a lower feed inlet, a bottom catalyst inlet and a top outlet, the secondary riser reactor 304 is provided with a lower feed inlet, a bottom catalyst inlet and a top outlet, and the top outlet of the secondary riser reactor 304 is connected to the upper middle portion of the primary riser reactor 301 via a horizontal pipe;

the top outlet of the primary riser reactor 301 is connected to an inlet of the disengager 306, a catalyst outlet of the disengager 306 is connected to the regenerator 305, an oil-gas outlet of the disengager 306 is connected to an inlet of the product separation unit 303, a light cycle oil outlet of the product separation unit 303 is connected to an inlet of the hydrogenation reactor 302, a hydrogenation light cycle oil outlet of the hydrogenation reactor 302 is connected to the feed inlet of the secondary riser reactor 304, a catalyst outlet of the regenerator 305 is connected to the catalyst inlet of the primary riser reactor 301 and the catalyst inlet of the secondary riser reactor 304.

B13. The system according to item B12, wherein the primary riser reactor 301 comprises a first reaction section I and a second reaction section II that are coaxially arranged from bottom to top, with the inner diameter of the second reaction section II being larger than that of the first reaction zone I, and the top outlet of the secondary riser reactor 304 is connected to the second reaction zone II via a horizontal pipe.

C1. A process for producing catalytic cracking gasoline comprising the following steps:
i) subjecting a heavy feedstock oil to a catalytic cracking reaction in the presence of a first catalytic cracking catalyst to obtain a first reaction product;
ii) subjecting a hydrogenated cycle oil to a catalytic cracking reaction in the presence of a second catalytic cracking catalyst to obtain a second reaction product;
iii) separating a mixture of the first reaction product and the second reaction product to obtain a catalytic cracking gasoline and a catalytic cracking light cycle oil;
iv) subjecting the catalytic cracking light cycle oil or a fraction thereof to hydrogenation to obtain a hydrogenated product; and
v) recycling the hydrogenated product to the step ii) as the hydrogenated cycle oil,
wherein the step ii) and the step i) are carried out in a single riser reactor, and the heavy feedstock oil and the hydrogenated cycle oil are fed into the riser reactor at different heights thereof, and the first catalytic cracking catalyst and the second catalytic cracking catalyst are injected into the riser reactor at different points; or
the step ii) and the step i) are carried out in separate riser reactors, and the second reaction product is fed into the upper middle portion of the riser reactor used in the step i), where it is mixed with the first reaction product.

C2. The process according to item C1, comprising the following steps:
i) spraying the heavy feedstock oil into a riser reactor via a first nozzle, injecting the first catalytic cracking catalyst into the riser reactor at a first injection point located below the first nozzle, and subjecting the heavy feedstock oil to a catalytic cracking reaction to obtain a first reaction product;
ii) spraying the hydrogenated cycle oil into the riser reactor used in the step i) via a second nozzle, injecting the second catalytic cracking catalyst into the riser reactor at a second injection point located below the second nozzle, and subjecting the hydrogenated cycle oil to a catalytic cracking reaction to obtain a second reaction product;
iii) separating a mixture of the first reaction product and the second reaction product to obtain a catalytic cracking gasoline and a catalytic cracking light cycle oil;
iv) subjecting the catalytic cracking light cycle oil or a fraction thereof to hydrogenation to obtain a hydrogenated product; and
v) recycling the hydrogenated product to the step ii) as the hydrogenated cycle oil,
wherein the second nozzle and the first nozzle are disposed at different heights of the riser reactor, and the second injection point is different from the first injection point.

C3. The process according to item C1, comprising the following steps:
i) spraying the heavy feedstock oil into a primary riser reactor via a first nozzle, injecting the first catalytic cracking catalyst into the primary riser reactor at a first injection point located below the first nozzle, and subjecting the heavy feedstock oil to a catalytic cracking reaction to obtain a first reaction product;

ii) spraying the hydrogenated cycle oil into a secondary riser reactor via a second nozzle, injecting the second catalytic cracking catalyst into the secondary riser reactor at a second injection point located below the second nozzle, and subjecting the hydrogenated cycle oil to a catalytic cracking reaction to obtain a second reaction product;

iii) separating a mixture of the first reaction product and the second reaction product to obtain a catalytic cracking gasoline and a catalytic cracking light cycle oil;

iv) subjecting the catalytic cracking light cycle oil or a fraction thereof to hydrogenation to obtain a hydrogenated product; and v) recycling the hydrogenated product to the step ii) as the hydrogenated cycle oil, wherein the second reaction product is fed into the upper middle portion of the primary riser reactor, where it is mixed with the first reaction product.

C4. The process according to item C2, wherein, along the height direction of the riser reactor, the second nozzle is disposed above the first nozzle, and the second injection point is disposed at a position between the first nozzle and the second nozzle.

C5. The process according to item C4, wherein the reaction time in the riser reactor section between the first nozzle and the second nozzle is between about 0.05 and about 2 seconds, preferably between about 0.1 and about 1 second.

C6. The process according to any one of items C2 and C4 to C5, wherein the reaction conditions in the riser reactor are as follows: a reaction temperature ranging from about 450 to about 650° C., preferably from about 490 to about 550° C., an absolute pressure ranging from about 0.15 to about 0.4 MPa, a weight ratio of the total weight of the first and second catalytic cracking catalysts to the heavy feedstock oil ranging from about 1 to about 50, preferably from about 3 to about 30, a reaction time of the heavy feedstock oil ranging from about 1 to about 10 seconds, preferably from about 2 to about 8 seconds, and a weight ratio of steam to the heavy feedstock oil ranging from about 0.01 to about 0.5, preferably from about 0.02 to about 0.2; a weight ratio of the total weight of the first and second catalytic cracking catalysts to the hydrogenated cycle oil ranging from about 5 to about 100, preferably from about 8 to about 50, a reaction time of the hydrogenated cycle oil ranging from about 1 to about 10 seconds, preferably from about 2 to about 8 seconds, and a weight ratio of steam to the hydrogenated cycle oil ranging from about 0.01 to about 0.3, preferably from about 0.01 to about 0.1, with both the first catalytic cracking catalyst and the second catalytic cracking catalyst having a micro-activity of no less than about 60, preferably no less than about 62.

C7. The process according to item C3, wherein the reaction conditions in the primary riser reactor are as follows: a reaction temperature ranging from about 450 to about 550° C., preferably from about 500 to about 520° C., a weight ratio of the first catalytic cracking catalyst to the heavy feedstock oil ranging from about 4 to about 8, preferably from about 5 to about 7, a reaction time ranging from about 2 to about 10 seconds, preferably from about 2 to about 8 seconds, an absolute pressure ranging from about 0.15 to about 0.4 MPa, a weight ratio of steam to the heavy feedstock oil ranging from about 0.02 to about 0.08, preferably from about 0.03 to about 0.05, and a micro-activity of the first catalytic cracking catalyst of no less than about 60, preferably no less than about 62; and/or the reaction conditions in the secondary riser reactor are as follows: a reaction temperature ranging from about 520 to about 650° C., preferably from about 550 to about 590° C., an absolute pressure ranging from about 0.15 to about 0.4 MPa, a weight ratio of the second catalytic cracking catalyst to the hydrogenated cycle oil ranging from about 5 to about 100, preferably from about 8 to about 50, a reaction time ranging from about 1 to about 10 seconds, preferably from about 1 to about 8 seconds, a weight ratio of steam to the hydrogenated cycle oil ranging from about 0.01 to about 0.3, preferably from about 0.02 to about 0.2, and a micro-activity of the second catalytic cracking catalyst of no less than about 60, preferably no less than about 62.

C8. The process according to any one of items C1 to C7, wherein the weight ratio of the first catalytic cracking catalyst to the second catalytic cracking catalyst is in a range from about 1:0.02 to about 1:1, preferably from about 1:0.03 to about 1:0.5.

C9. The process according to any one of items C1 to C8, wherein the riser reactor is an equal-diameter riser reactor with or without a fluidized bed reactor, or a variable-diameter riser reactor with or without a fluidized bed reactor.

C10. The process according to item C3 or C7, wherein the primary riser reactor comprises a first reaction section and a second reaction section that are coaxially arranged from bottom to top, with the inner diameter of the second reaction section being larger than that of the first reaction section, and the outlet of the secondary riser reactor is connected to the second reaction section via a horizontal pipe.

C11. The process according to any one of items C1 to C10, further comprising:

splitting the catalytic cracking light cycle oil into a light fraction and a heavy fraction prior to the step iv), and subjecting the heavy fraction to hydrogenation in the step iv) to obtain the hydrogenated product; and recycling the light fraction to the step ii) and subjecting it to a catalytic cracking reaction in the presence of the second catalytic cracking catalyst.

C12. The process according to item C11, wherein the catalytic cracking light cycle oil is split at a cut point between about 240 and about 260° C.

C13. The process according to any one of items C1 to C12, wherein the heavy feedstock oil is selected from the group consisting of straight-run wax oil, coker wax oil, deasphalted oil, hydrorefined oil, hydrocracking tail oil, vacuum residue, atmospheric residue, and combinations thereof.

C14. The process according to any one of items C1 to C13, wherein the first catalytic cracking catalyst and the second catalytic cracking catalyst each independently comprises, on a dry basis, about 10% to about 50% by weight of a zeolite, about 5% to about 90% by weight of an inorganic oxide and about 0% to about 70% by weight of a clay, based on the weight of the catalytic cracking catalyst; the zeolite is selected from the group consisting of a Y zeolite with or without a rare earth element, an HY zeolite with or without a rare earth element, a USY zeolite with or without a rare earth element, a Beta zeolite with or without a rare earth element, and combinations thereof; the inorganic oxide is selected from the group consisting of silica, alumina, and combinations thereof; and the clay is selected from kaolin and/or halloysite.

C15. The process according to any one of items C1 to C14, wherein the step iv) is carried out in the presence of a hydrogenation catalyst comprising an active metallic component and a support, said active metallic component is a Group VIB metal and/or a Group VIII non-noble metal, and the support is selected from the group consisting of alumina, silica, amorphous silica-alumina, and combinations thereof; preferably, the hydrogenation catalyst comprises about 15% to about 30% by weight of the active metallic component and about 70% to about 85% by weight of the support.

C16. The process according to item C15, wherein the active metallic component is nickel-tungsten, nickel-tungsten-cobalt, nickel-molybdenum or cobalt-molybdenum.

C17. The process according to any one of items C1 to C16, wherein the hydrogenation conditions employed in the step iv) are as follows: a hydrogen partial pressure ranging from about 5.0 to about 22.0 MPa, preferably from about 8.0 to about 15.0 MPa, a reaction temperature ranging from about 330 to about 450° C., preferably from about 340 to about 380° C., a volume space velocity ranging from about 0.1 to about 10.0 $h^{-1}$, preferably from about 0.1 to about 3.0 $h^{-1}$, and a hydrogen-to-oil volume ratio ranging from about 100 to about 2000 $Nm^3/m^3$, preferably from about 350 to about 1200 $Nm^3/m^3$.

C18. The process according to any one of items C1 to C17, wherein the hydrogenation step iv) is carried out to an extent that the resultant hydrogenated product has a bicyclic aromatics content of no more than about 20% by weight, preferably no more than about 10% by weight, more preferably no more than about 8% by weight, a hydrogen content of no less than about 10% by weight, preferably no less than about 11% by weight, more preferably no less than about 14% by weight, and an initial boiling point of greater than about 165° C., preferably greater than about 170° C.

C19. A catalytic cracking system for carrying out the process according to item C1, comprising a primary riser reactor, a secondary riser reactor, a regenerator, a disengager, a main fractionation column, a light cycle oil fractionation column, and a hydrogenation reactor, wherein:

the primary riser reactor is provided with a lower feed inlet, a bottom catalyst inlet and a top outlet, the secondary riser reactor is provided with a first feed inlet and a second feed inlet at a lower portion, a bottom catalyst inlet and a top outlet, and the top outlet of the secondary riser reactor is connected to the upper middle portion of the primary riser reactor via a horizontal pipe, the top outlet of the primary riser reactor is connected to an inlet of the disengager, a catalyst outlet of the disengager is connected to the regenerator, an oil-gas outlet of the disengager is connected to an inlet of the main fractionation column, and a light cycle oil outlet of the main fractionation column is connected to an inlet of the light cycle oil fractionation column, a heavy fraction outlet of the light cycle oil fractionation column is connected to an inlet of the hydrogenation reactor, a light fraction outlet of the light cycle oil fractionation column is connected to the second feed inlet of the secondary riser reactor, and a hydrogenated product outlet of the hydrogenation reactor is connected to the first feed inlet of the secondary riser reactor, and a regenerated catalyst outlet of the regenerator is connected to the catalyst inlet of the primary riser reactor and the catalyst inlet of the secondary riser reactor, respectively.

C20. The system according to item C19, wherein the primary riser reactor comprises a first reaction section and a second reaction section that are coaxially arranged from bottom to top, with the inner diameter of the second reaction section being larger than that of the first reaction section, and the top outlet of the secondary riser reactor is connected to the second reaction section via a horizontal pipe.

EXAMPLES

The present application will be further illustrated with reference to the following examples, but the present application is not limited thereto.

Starting Materials and Reagents

In the following examples and comparative examples, the hydrogenation catalyst with a trade name of RN-32V, and the protective agent with a trade name of RG-1 charged in the hydrogenation reactor were both manufactured by Sinopec Catalyst Branch. The hydrogenation catalyst and the protective agent were loaded at a volume ratio of 95:5.

In the following examples and comparative examples, the catalytic cracking catalyst with a trade name of HAC used in the riser reactor was manufactured by Sinopec Catalyst Branch, and its physicochemical properties are shown in Table 1.

TABLE 1

Physicochemical properties of the catalyst HAC

| Item | | Unit | Value |
|---|---|---|---|
| Loss on ignition | | wt % | 11.6 |
| $Al_2O_3$ | | wt % | 47.8 |
| Na | | wt % | 0.12 |
| Fe | | wt % | 0.23 |
| $SO_4^{2-}$ | | wt % | 1.15 |
| Pore volume | | ml/g | 0.35 |
| Specific surface area | | $m^2/g$ | 244 |
| Apparent bulk density | | g/ml | 0.75 |
| Abrasion index | | wt % | 1.1 |
| Particle size | 0-20 μm | vol % | 1.3 |
| | 0-40 μm | vol % | 16.4 |
| | 0-149 μm | vol % | 92.4 |
| Micro-activity | | | 65 |

In the following examples and comparative examples, the heavy feedstock oil used was a mixed feedstock comprising 90% by weight of a straight-run wax oil and 10% by weight of a vacuum residue, and its properties are shown in Table 2.

TABLE 2

Properties of the heavy feedstock oil

| Name | Mixed feedstock |
|---|---|
| Density (20° C.), $kg/m^3$ | 916.8 |
| Freezing point, ° C. | 32 |
| Refractive index (70° C.) | 1.4968 |
| Carbon residue, wt % | 2.67 |
| Average molecular weight | 404 |
| Boiling range, ° C. | |
| Initial boiling point | 294 |
| 5 wt % | 361 |
| 10 wt % | 381 |
| 30 wt % | 422 |
| 50 wt % | 451 |
| 70 wt % | 497 |
| Sulfur content, wt % | 1.1 |
| Nitrogen content, wt % | 0.24 |
| Hydrogen content, wt % | 12.6 |
| Metal content, mg/kg | |
| Ni | 6.6 |
| V | 1.2 |

Calculation of Parameters

Recycle ratio of Light cycle oil (LCO)=weight of the light cycle oil hydrogenated and re-refined/weight of the heavy feedstock oil.

Hydrogen consumption=amount of fresh hydrogen consumed in the hydrogenation reactor/weight of fresh feed to the hydrogenation reactor.

Method of Measurement

The research octane number (RON) of the gasoline product was measured according to the method of Chinese National Standard GB/T 5487-2015, and the motor octane number (MON) of the gasoline product was measured according to the method of Chinese National Standard GB/T 503-2016.

The micro-activity (MAT) of the regenerated catalyst was determined according to the standard method of RIPP 92-90 (see "Petrochemical Analysis Method (RIPP Test Method)", edited by Cuiding Yang, et. al., Science Press, September 1990, First Version, pages 263-268) under the following conditions: catalyst: 5.0 g (20-40 mesh); oil intake: 1.56 grams; reaction time: 70 seconds; reaction temperature: 460° C.; catalyst/oil: 3.2; and space velocity: 16 $h^{-1}$.

Example 1

This example was carried out in accordance with the process flow shown in FIG. 1. The riser reactor used was an equal-diameter riser reactor, and the heavy feedstock oil and the hydrogenated cycle oil were sprayed into the riser reactor via the first nozzle and the second nozzle, respectively. The conditions for the catalytic cracking reaction are shown in Table 3. The reaction time in the riser reactor section between the second nozzle and the first nozzle was 0.2 seconds.

The hydrotreatment conditions were as follows: a hydrogen partial pressure of 8.0 MPa, an average bed reaction temperature of 360° C., a volume space velocity of 0.5 $h^{-1}$, and a hydrogen-to-oil volume ratio of 1100 $Nm^3/m^3$. The hydrogenated product (i.e., the hydrogenated cycle oil) had an initial boiling point of 170° C., a bicyclic aromatics content of 19% by weight, and a hydrogen content of 11% by weight.

The distribution of reaction product, hydrogen consumption and octane number of gasoline obtained in this example are shown in Table 4.

Example 2

This example was carried out in accordance with the process flow shown in FIG. 2, in which the catalytic cracking light cycle oil was split into a light fraction and a heavy fraction at a cut point of 250° C., the heavy fraction was subjected to hydrogenation to obtain a hydrogenated product (i.e., the hydrogenated cycle oil), and the heavy feedstock oil, the hydrogenated cycle oil, and the light fraction were sprayed into the riser reactor via the first nozzle, the second nozzle, and the third nozzle, respectively.

The conditions for the catalytic cracking reaction were as follows: a reaction temperature of 500° C., an absolute pressure of 0.25 MPa, a weight ratio of the total weight of the regenerated catalyst injected into the riser reactor to the heavy feedstock oil of 6.0, a reaction time of the heavy feedstock oil of 2.8 seconds, a weight ratio of steam to the heavy feedstock oil of 0.05, a weight ratio of the total weight of the regenerated catalyst to the hydrogenated cycle oil of 20, a weight ratio of steam to the hydrogenated cycle oil of 0.02, a weight ratio of the total weight of the regenerated catalyst to the light fraction of 40, a weight ratio of steam to the light fraction of 0.05, and a micro-activity of the regenerated catalyst of 65. The reaction time in the riser reactor section between the second nozzle and the first nozzle is 1.4 seconds, and the reaction time in the riser reactor section between the third nozzle and the second nozzle is 0.6 seconds.

The hydrotreatment conditions were as follows: a hydrogen partial pressure of 8.0 MPa, an average bed reaction temperature of 360° C., a volume space velocity of 0.5 $h^{-1}$, and a hydrogen-to-oil volume ratio of 1100 $Nm^3/m^3$. The hydrogenated product (i.e., the hydrogenated cycle oil) had an initial boiling point of 250° C., a bicyclic aromatics content of 20% by weight, and a hydrogen content of 10% by weight.

The distribution of reaction product, hydrogen consumption and octane number of gasoline obtained in this example are shown in Table 4.

Comparative Example 1

The experiment was carried out as described in Example 1, except that the hydrogenated cycle oil and the heavy feedstock oil were combined and then sprayed into the riser reactor via the first nozzle. The conditions for the catalytic cracking reaction were shown in Table 3.

The hydrotreatment conditions were the same as in Example 1. The hydrogenated product (i.e., the hydrogenated cycle oil) had an initial boiling point of 170° C., a bicyclic aromatics content of 19% by weight, and a hydrogen content of 11% by weight.

The distribution of reaction product, hydrogen consumption and octane number of gasoline obtained in this comparative example are shown in Table 4.

Comparative Example 2

The experiment was carried out as described in Example 1, except that all of the regenerated catalyst recycled to the riser reactor was injected at the first injection point. The conditions for the catalytic cracking reaction are shown in Table 3.

The hydrotreatment conditions were the same as in Example 1. The hydrogenated product (i.e., the hydrogenated cycle oil) had an initial boiling point of 170° C., a bicyclic aromatics content of 19% by weight, and a hydrogen content of 11% by weight.

The distribution of reaction product, hydrogen consumption and octane number of gasoline obtained in this comparative example are shown in Table 4.

TABLE 3

Catalytic cracking conditions used in Example 1 and Comparative Examples 1-2

| Item | Ex. 1 | Comp. Ex. 1 | Comp. Ex. 2 |
|---|---|---|---|
| Reaction temperature, ° C. | 500 | 500 | 500 |
| Absolute pressure, MPa | 0.25 | 0.25 | 0.25 |
| Micro-activity of the regenerated catalyst | 64 | 64 | 64 |
| Heavy feedstock oil | | | |
| Catalyst-to-oil weight ratio (based on the total weight of the catalyst) | 8.1 | 8.0 | 8.1 |
| Reaction time, second | 2.8 | 2.8 | 2.8 |
| Weight ratio of steam to heavy feedstock oil | 0.05 | 0.05 | 0.05 |
| Hydrogenated cycle oil | | | |
| Catalyst-to-oil weight ratio (based on the total weight of the catalyst) | 20 | 40 | 20 |
| Weight ratio of steam to | 0.01 | 0.01 | 0.01 |

TABLE 3-continued

Catalytic cracking conditions used in Example 1 and Comparative Examples 1-2

| Item | Ex. 1 | Comp. Ex. 1 | Comp. Ex. 2 |
|---|---|---|---|
| hydrogenated cycle oil | | | |
| Recycle ratio of LCO | 0.2 | 0.09 | 0.2 |
| Cyclic weight ratio of the first catalytic cracking catalyst to the second catalytic cracking catalyst | 1:0.05 | 1:0.05 | / |

TABLE 4

Results of Examples 1-2 and Comparative Examples 1-2

| Item | Ex. 1 | Ex. 2 | Comp. Ex. 1 | Comp. Ex. 2 |
|---|---|---|---|---|
| Hydrogen consumption, wt % | 2.5 | 2 | 2.6 | 2.6 |
| Product distribution, wt % | | | | |
| Dry gas | 4.1 | 4 | 3.6 | 4.6 |
| Liquefied gas | 18.5 | 18.5 | 17.5 | 18.3 |
| Gasoline | 58.3 | 58.8 | 54.2 | 53.7 |
| Light diesel oil | 0 | 0 | 0 | 0 |
| Heavy oil | 9.2 | 9.7 | 14.7 | 13.0 |
| Coke | 9.9 | 9 | 10.0 | 10.4 |
| Total | 100.0 | 100 | 100.0 | 100.0 |
| Octane number of gasoline | | | | |
| RON | 92.5 | 92 | 90.5 | 91.6 |
| MON | 82.6 | 84 | 80.4 | 81.3 |

As can be seen from the results of Table 4, when compared to Comparative Example 1 in which a combined feed of the hydrogenated cycle oil and the heavy feedstock oil was used and Comparative Example 2 in which all of the regenerated catalyst was injected at the first injection point, Examples 1-2 of the present invention show a higher yield of gasoline, an improved product distribution, and a higher octane number of gasoline.

When compared to Example 1, Example 2 shows a reduced hydrogen consumption, an improved product distribution, and a higher yield of gasoline due to the splitting of the catalytic cracking light cycle oil.

Example 3

This example was carried out in accordance with the process flow shown in FIG. 3, and the primary and secondary riser reactors used were both equal-diameter riser reactors. The heavy feedstock oil was sprayed into the primary riser reactor via the first nozzle, and the hydrogenated cycle oil was sprayed into the secondary riser reactor via the second nozzle. The conditions for the catalytic cracking reaction are shown in Table 5.

The hydrotreatment conditions were as follows: a hydrogen partial pressure of 8.0 MPa, an average bed reaction temperature of 360° C., a volume space velocity of 0.5 h$^{-1}$, and a hydrogen-to-oil volume ratio of 1100 Nm$^3$/m$^3$. The hydrogenated product (i.e., the hydrogenated cycle oil) had an initial boiling point of 170° C., a bicyclic aromatics content of 19% by weight, and a hydrogen content of 11% by weight.

The distribution of reaction product, hydrogen consumption and octane number of gasoline obtained in this example are shown in Table 6.

Example 4

The experiment was carried out as described in Example 3, except that the primary riser reactor was a variable-diameter riser reactor comprising a pre-lifting section, a reaction section (i.e., the first reaction section I), an expanded section (i.e., the second reaction section II) and an outlet section from bottom to top. The reaction conditions in the reaction section were as follows: a reaction temperature of 500° C., an absolute pressure of 0.25 MPa, a micro-activity of the regenerated catalyst of 64, a catalyst-to-oil weight ratio of 6.1, a reaction time of 1.2 seconds, and a weight ratio of steam to the heavy feedstock oil of 0.06; and the reaction conditions in the expanded section were as follows: a reaction temperature of 490° C., and a reaction time of 5 seconds.

The reaction conditions in the secondary riser reactor and the hydrotreatment conditions were the same as in Example 3, and the recycle ratio of the light cycle oil was 0.15. The hydrogenated product (i.e., the hydrogenated cycle oil) had an initial boiling point of 170° C., a bicyclic aromatics content of 19% by weight, and a hydrogen content of 11% by weight.

The distribution of reaction product, hydrogen consumption and octane number of gasoline obtained in this example are shown in Table 6.

Example 5

This example was carried out in accordance with the process flow shown in FIG. 4, and the primary and secondary riser reactors used were both equal-diameter riser reactors. The heavy feedstock oil was sprayed into the primary riser reactor via the first nozzle, and the catalytic cracking light cycle oil was split into a light fraction and a heavy fraction at a cut point of 250° C. The heavy fraction was subjected to hydrogenation to obtain a hydrogenated product (i.e., the hydrogenated cycle oil). The hydrogenated cycle oil and the light fraction were injected into the secondary riser reactor via the second nozzle and the third nozzle, respectively.

The catalytic cracking conditions in the secondary riser reactor were as follows: a reaction temperature of 550° C., an absolute pressure of 0.25 MPa, a weight ratio of the regenerated catalyst injected into the secondary riser reactor to the hydrogenated cycle oil of 8, a reaction time of the hydrogenated cycle oil of 2.8, a weight ratio of steam to the hydrogenated cycle oil of 0.02, a weight ratio of the regenerated catalyst to the light fraction of 6, a weight ratio of steam to the light fraction of 0.02, and a micro-activity of the regenerated catalyst of 64. The reaction time in the riser reactor section between the third nozzle and the second nozzle was 0.2.

The reaction conditions in the primary riser reactor and the hydrotreatment conditions were the same as in Example 3, and the cyclic weight ratio of the light cycle oil was 0.2. The hydrogenated product (i.e., the hydrogenated cycle oil) had an initial boiling point of 250° C., a bicyclic aromatics content of 20% by weight, and a hydrogen content of 10% by weight.

The distribution of reaction product, hydrogen consumption and octane number of gasoline obtained in this example are shown in Table 6.

Comparative Example 3

The experiment was carried out as described in Example 3, except that only the primary riser reactor was used, and the secondary riser reactor was eliminated. The hydrogenated product obtained by hydrogenation of the catalytic cracking light cycle oil (i.e., the hydrogenated cycle oil) and the heavy feedstock oil were combined and sprayed into the primary riser reactor via the first nozzle. The catalytic cracking conditions in the primary riser reactor are shown in Table 5.

The hydrotreatment conditions were the same as in Example 3. The hydrogenated product (i.e., the hydrogenated cycle oil) had an initial boiling point of 170° C., a bicyclic aromatics content of 19% by weight, and a hydrogen content of 11% by weight.

The distribution of reaction product, hydrogen consumption and octane number of gasoline obtained in this comparative example are shown in Table 6.

TABLE 5

Catalytic cracking conditions used in Example 3 and Comparative Example 3

| Item | Ex. 3 | | Comp. Ex. 3 |
|---|---|---|---|
| Operating parameters | Primary riser reactor | Secondary riser reactor | Primary riser reactor |
| Reaction temperature, ° C. | 500 | 550 | 500 |
| Absolute pressure, MPa | 0.25 | 0.25 | 0.25 |
| Micro-activity of the regenerated catalyst | | 64 | |
| Catalyst-to-oil weight ratio | 6.1 | 8 | 6.1 |
| Reaction time, second | 2.8 | 1.2 | 2.8 |
| Weight ratio of steam to heavy feedstock oil/hydrogenated cycle oil | 0.05 | 0.01 | 0.05 |
| Recycle ratio of LCO | 0.2 | | 0.2 |

TABLE 6

Results of Examples 3-5 and Comparative Example 3

| Item | Ex. 3 | Ex. 4 | Ex. 5 | Comp. Ex. 3 |
|---|---|---|---|---|
| Hydrogen consumption, wt % | 2.5 | 2.5 | 2 | 2.6 |
| Product distribution, wt % | | | | |
| Dry gas | 4.0 | 4.22 | 3.5 | 3.8 |
| Liquefied gas | 19.5 | 18.3 | 19.8 | 17.5 |
| Gasoline | 57.6 | 58.5 | 59.5 | 46.4 |
| Light diesel oil | 0 | 0 | 0 | 7.6 |
| Heavy oil | 8.40 | 8.02 | 8 | 14.5 |
| Coke | 10.5 | 10.96 | 9.2 | 10.2 |
| Total | 100 | 100 | 100 | 100.0 |
| Octane number of gasoline | | | | |
| RON | 92.5 | 93.6 | 93 | 90.5 |
| MON | 82.6 | 83.6 | 86 | 80.4 |

As can be seen from the results of Table 6, when compared to Comparative Example 3 using a single riser reactor and a combined feed of the hydrogenated cycle oil and the heavy feedstock oil, Examples 3-5 of the present invention provide an independent reaction environment for the hydrogenated LCO, which is favorable to the optimization of the reaction of the hydrogenated LCO, thereby resulting in a higher yield of gasoline with a higher octane number.

When compared to Example 3, the use of the variable-diameter riser reactor having an expanded section in Example 4 as the primary riser reactor enhances the hydrogen transfer reaction and the isomerization reaction, thereby resulting in an increase in the octane number of gasoline. When compared to Example 3, Example 5 shows a reduced hydrogen consumption and a higher yield of gasoline due to the splitting of the catalytic cracking light cycle oil.

In the foregoing description, the concepts of the present application have been described with reference to specific embodiments. However, it can be appreciated that various modifications and changes can be made without departing from the scope of the invention as set forth in the appended claims. Accordingly, the specification and drawings are to be regarded in an illustrative rather than a restrictive sense, and all such modifications and changes are intended to be included within the scope of the present application.

It can also be appreciated that various features that are, for clarity, described herein in the context of separate embodiments may also be provided in combination in a single embodiment. Meanwhile, various features that are, for brevity, described in the context of a single embodiment may also be provided separately or in any sub-combination.

What is claimed:

1. A process for producing catalytic cracking gasoline comprising the steps of:
    i) subjecting a heavy feedstock oil to a catalytic cracking reaction in the presence of a first catalytic cracking catalyst to obtain a first reaction product;
    ii) subjecting a hydrogenated cycle oil to a catalytic cracking reaction in the presence of a second catalytic cracking catalyst to obtain a second reaction product;
    iii) separating a mixture of the first reaction product and the second reaction product to obtain a catalytic cracking gasoline and a catalytic cracking light cycle oil;
    iv) subjecting the catalytic cracking light cycle oil or a fraction thereof to hydrogenation to obtain a hydrogenated product; and
    v) recycling the hydrogenated product to the step ii) as the hydrogenated cycle oil,
    wherein the step ii) and the step i) are carried out in a single riser reactor, and the heavy feedstock oil and the hydrogenated cycle oil are fed into the riser reactor at different heights thereof, and the first catalytic cracking catalyst and the second catalytic cracking catalyst are injected into the riser reactor at different points; or
    the step i) is carried out in a primary riser reactor and the step ii) is carried out in a secondary riser reactor, wherein the second reaction product is fed into a upper middle portion of the primary riser reactor and is mixed with the first reaction product in the primary riser reactor.

2. The process according to claim 1, wherein the weight ratio of the first catalytic cracking catalyst to the second catalytic cracking catalyst is in a range from 1:0.02 to 1:1.

3. The process according to claim 1, wherein the single riser reactor is an equal-diameter riser reactor with or without a fluidized bed reactor, or a variable-diameter riser reactor with or without a fluidized bed reactor, or
    each of the primary riser reactor and the secondary riser reactor is independently an equal-diameter riser reactor with or without a fluidized bed reactor, or a variable-diameter riser reactor with or without a fluidized bed reactor.

4. The process according to claim 1, further comprising:
    separating the catalytic cracking light cycle oil into a light fraction and a heavy fraction prior to the step iv), and subjecting the heavy fraction to hydrogenation in the step iv) to obtain the hydrogenated product; and catalytic cracking the light fraction in the presence of the second catalytic cracking catalyst.

5. The process according to claim 4, wherein the catalytic cracking light cycle oil is separated at a cut point between 240° C. and 260° C.

6. The process according to claim 1, wherein the heavy feedstock oil is selected from the group consisting of straight-run wax oil, coker wax oil, deasphalted oil, hydrorefined oil, hydrocracking tail oil, vacuum residue, atmospheric residue, and combinations thereof.

7. The process according to claim 1, wherein the first catalytic cracking catalyst and the second catalytic cracking catalyst each independently comprises, on a dry basis, 10% to 50% by weight of a zeolite, 5% to 90% by weight of an inorganic oxide and 0% to 70% by weight of a clay, based on the weight of the catalytic cracking catalyst;
wherein the zeolite is selected from the group consisting of a Y zeolite with or without a rare earth element, an HY zeolite with or without a rare earth element, a USY zeolite with or without a rare earth element, a Beta zeolite with or without a rare earth element, and combinations thereof; the inorganic oxide is selected from the group consisting of silica, alumina, and combinations thereof; and wherein the clay is selected from kaolin and/or halloysite.

8. The process according to claim 1, wherein the step iv) is carried out in the presence of a hydrogenation catalyst comprising an active metallic component and a support, said active metallic component is a Group VIB metal and/or a Group VIII non-noble metal, and the support is selected from the group consisting of alumina, silica, amorphous silica-alumina, and combinations thereof.

9. The process according to claim 8, wherein the active metallic component is nickel-tungsten, nickel-tungsten-cobalt, nickel-molybdenum or cobalt-molybdenum.

10. The process according to claim 1, wherein the hydrogenation conditions employed in the step iv) include: a hydrogen partial pressure ranging from 5.0 MPa to 22.0 MPa, a reaction temperature ranging from 330° C. to 450° C., a volume space velocity ranging from 0.1 h$^{-1}$ to 10.0 h$^{-1}$, and a hydrogen-to-oil volume ratio ranging from 100 Nm$^3$/m$^3$ to 2000 Nm$^3$/m$^3$.

11. The process according to claim 1, wherein the hydrogenation step iv) is carried out to an extent that a resultant hydrogenated product has a bicyclic aromatics content of no more than 20% by weight, a hydrogen content of no less than 10% by weight, and an initial boiling point of greater than 165° C.

12. A process for producing catalytic cracking gasoline comprising the steps of:
i) spraying a heavy feedstock oil into a riser reactor via a first nozzle, injecting a first catalytic cracking catalyst into the riser reactor at a first injection point located below the first nozzle, and subjecting the heavy feedstock oil to a catalytic cracking reaction to obtain a first reaction product;
ii) spraying a hydrogenated cycle oil into the riser reactor via a second nozzle, injecting a second catalytic cracking catalyst into the riser reactor at a second injection point located below the second nozzle, and subjecting the hydrogenated cycle oil to a catalytic cracking reaction to obtain a second reaction product;
iii) separating a mixture of the first reaction product and the second reaction product to obtain a catalytic cracking gasoline and a catalytic cracking light cycle oil;
iv) subjecting the catalytic cracking light cycle oil or a fraction thereof to hydrogenation to obtain a hydrogenated product; and
v) recycling the hydrogenated product to the step ii) as the hydrogenated cycle oil,
wherein the second nozzle and the first nozzle are disposed at different heights of the riser reactor, and the second injection point is different from the first injection point.

13. The process according to claim 12, wherein, along a vertical direction of the riser reactor, the second nozzle is disposed above the first nozzle, and the second injection point is disposed at a position between the first nozzle and the second nozzle.

14. The process according to claim 13, wherein the reaction time in the riser reactor section between the first nozzle and the second nozzle is between 0.05 seconds and 2 seconds.

15. The process according to claim 12, wherein the reaction conditions in the riser reactor include: a reaction temperature ranging from 450° C. to 650° C., an absolute pressure ranging from 0.15 MPa to 0.4 MPa, a weight ratio of the total weight of the first and second catalytic cracking catalysts to the heavy feedstock oil ranging from 1 to 50, a reaction time of the heavy feedstock oil ranging from 1 second to 10 seconds, and a weight ratio of steam to the heavy feedstock oil ranging from 0.01 to 0.5; a weight ratio of the total weight of the first and second catalytic cracking catalysts to the hydrogenated cycle oil ranging from 5 to 100, a reaction time of the hydrogenated cycle oil ranging from 1 second to 10 seconds, and a weight ratio of steam to the hydrogenated cycle oil ranging from 0.01 to 0.3, with both the first catalytic cracking catalyst and the second catalytic cracking catalyst having a micro-activity of no less than 60.

16. A process for producing catalytic cracking gasoline comprising the steps of:
i) spraying a heavy feedstock oil into a primary riser reactor via a first nozzle, injecting a first catalytic cracking catalyst into the primary riser reactor at a first injection point located below the first nozzle, and subjecting the heavy feedstock oil to a catalytic cracking reaction to obtain a first reaction product;
ii) spraying a hydrogenated cycle oil into a secondary riser reactor via a second nozzle, injecting a second catalytic cracking catalyst into the secondary riser reactor at a second injection point located below the second nozzle, and subjecting the hydrogenated cycle oil to a catalytic cracking reaction to obtain a second reaction product;
iii) separating a mixture of the first reaction product and the second reaction product to obtain a catalytic cracking gasoline and a catalytic cracking light cycle oil;
iv) subjecting the catalytic cracking light cycle oil or a fraction thereof to hydrogenation to obtain a hydrogenated product; and
v) recycling the hydrogenated product to the step ii) as the hydrogenated cycle oil,
wherein the second reaction product is fed into a upper middle portion of the primary riser reactor and is mixed with the first reaction product in the primary riser reactor.

17. The process according to claim 16, wherein the reaction conditions in the primary riser reactor include: a reaction temperature ranging from 450° C. to 550° C., a weight ratio of the first catalytic cracking catalyst to the heavy feedstock oil ranging from 4 to 8, a reaction time ranging from 2 seconds to 10 seconds, an absolute pressure ranging from 0.15 MPa to 0.4 MPa, a weight ratio of steam to the heavy feedstock oil ranging from 0.02 to 0.08, and a micro-activity of the first catalytic cracking catalyst of no less than 60; and/or the reaction conditions in the secondary riser reactor include: a reaction temperature ranging from 520° C. to 650° C., an absolute pressure ranging from 0.15 MPa to 0.4 MPa, a weight ratio of the second catalytic cracking catalyst to the hydrogenated cycle oil ranging from 5 to 100, a reaction time ranging from 1 second to 10 seconds, a weight ratio of steam to the hydrogenated cycle oil ranging from 0.01 to 0.3, and a micro-activity of the second catalytic cracking catalyst of no less than 60.

18. The process according to claim 16, wherein the primary riser reactor comprises a first reaction section and a second reaction section that are coaxially arranged from bottom to top, with an inner diameter of the second reaction section being larger than that of the first reaction section, and an outlet of the secondary riser reactor is connected to the second reaction section via a horizontal pipe.

\* \* \* \* \*